(12) United States Patent
Vanier et al.

(10) Patent No.: US 7,826,605 B1
(45) Date of Patent: Nov. 2, 2010

(54) METHOD AND SYSTEM FOR INTEGRATING INFORMATION FROM WIRELESS AND LANDLINE TELEPHONE SYSTEMS

(76) Inventors: Andre Denis Vanier, 220 Palo Alto Ave. #102, Palo Alto, CA (US) 94301; Dinoo Jal Vanier, 6975 Elaine Way, San Diego, CA (US) 92120; Michael W. Slemmer, 6510 Pine Needle Dr., Oakland, CA (US) 94611; Faisal N. Jawdat, 5741 Elmer St., Pittsburgh, PA (US) 15232

( * ) Notice: Subject to any disclaimer, the term of this patent is extended or adjusted under 35 U.S.C. 154(b) by 1419 days.

(21) Appl. No.: 11/250,914

(22) Filed: Oct. 14, 2005

Related U.S. Application Data

(60) Provisional application No. 60/645,624, filed on Jan. 20, 2005.

(51) Int. Cl.
*H04M 3/42* (2006.01)
(52) U.S. Cl. .......................... 379/211.01; 379/201.01; 455/414.1
(58) Field of Classification Search ............ 379/211.01, 379/211.02, 212.01, 218.01, 265.01, 201.01; 455/414.1, 416, 461, 554.1, 556.1
See application file for complete search history.

(56) References Cited

U.S. PATENT DOCUMENTS

| | | | |
|---|---|---|---|
| 6,151,500 A * | 11/2000 | Cardina et al. ............ 455/435.2 |
| H2187 H | 4/2007 | Yuchimiuk | |
| 7,212,615 B2 | 5/2007 | Wolmuth | |
| 7,545,760 B1 * | 6/2009 | Daniel et al. ................ 370/310 |
| 2004/0235483 A1 * | 11/2004 | Sylvain ...................... 455/445 |
| 2005/0266830 A1 * | 12/2005 | Barclay et al. ........... 455/412.1 |
| 2006/0072734 A1 | 4/2006 | Baumeister et al. | |
| 2006/0099974 A1 * | 5/2006 | Contractor .................. 455/461 |
| 2006/0270405 A1 * | 11/2006 | Brem et al. .............. 455/432.3 |

* cited by examiner

*Primary Examiner*—William J Deane
(74) *Attorney, Agent, or Firm*—Sofer & Haroun, LLP

(57) ABSTRACT

A method of operating a telephony system. The method includes receiving a call from a caller through a telecommunication network, identifying a phone number associated with the call from the caller, and processing the phone number. The method also includes determining if the phone number is associated with a wireless telecommunications device, prompting the caller to input a residential phone number for a landline associated with the caller if the phone number is associated with the wireless cellular telecommunications device, and transferring the residential phone number from the caller using a communications process. The method further includes receiving the residential phone number and storing the residential phone number in association with the phone number into one or more memory locations of one or more databases.

6 Claims, 17 Drawing Sheets

|  | Identifier | Message | Selection Criteria 1 | Selection Criteria 2 |
|---|---|---|---|---|
| 220 | 650-814-8237 | 23 | Gender=Male | Time = a.m. |
| 224 | 650-814-8237 | 24 | Gender = Female | Time = a.m. |
| 228 | 650-462-1907 | 24 | Gender = Female | Time = a.m. |
| 232 | 650-462-1907 | 24 | Gender=Male | Time = a.m. |
| 236 | 650-349-3996 | 15 | Gender=Male | Time = a.m. |
| 240 | 650-349-3996 | 17 | Gender=Male | Time = p.m. |
|  | 244 | 248 | 252 | 256 |

| | 604 | 608 | 612 | 616 |
|---|---|---|---|---|
| | Identifier | Message | Gender Selection Criteria | Zip Code |
| 620 | 650-723-2312 | 15 | Male | 94025 |
| 624 | 650-723-2312 | 16 | Female | 94025 |
| 628 | 650-723-2312 | 17 | Female | 94025 |
| 632 | 650-497-2721 | 24 | Female | 94031 |
| 636 | 650-321-3211<br>640 | 28<br>644 | Male<br>648 | 94035<br>652 |

FIG. 6

|  | Caller's wireless phone number | Residential phone number | Message | Selection criteria: Time of Day |
|---|---|---|---|---|
| 820 | 650-814-8227 | 650-462-1907 | 12 | a.m. |
| 824 | 650-814-8316 | 650-462-1907 | 12 | a.m. |
| 828 | 650-814-8227 | 650-462-1907 | 28 | p.m. |
| 832 | 650-379-8048 | 650-466-0106 | 14 | a.m. |
| 836 | 650-379-8039 | 619-466-8047 | 14 | a.m. |

| Identifier 1004 | Value Description 1008 | Value Code 1012 |
|---|---|---|
| 650-462-1907 | High | 79 |
| 650-828-1932 | Medium/High | 54 |
| 650-818-1912 | Medium/Low | 29 |
| 650-812-3333 | Low | 17 |
| 1032 | 1036 | 1040 |

1016 → row 1; 1020 → row 2; 1024 → row 3; 1028 → row 4

FIG. 10

|       | Code | Step 1 | Step 2 | Step 3 |
|-------|------|--------|--------|--------|
| 1120  | 79   | Human Operator | n/a 1152 | n/a 1156 |
| 1124  | 54   | Computer | Human Operator 1160 | n/a |
| 1128  | 29   | Computer | Computer | Human Operator |
| 1132  | 17 1136 | Computer 1140 | Computer 1144 | Computer 1148 |

FIG. 11

METHOD AND SYSTEM FOR INTEGRATING INFORMATION FROM WIRELESS AND LANDLINE TELEPHONE SYSTEMS

CROSS-REFERENCES TO RELATED APPLICATIONS

This application claims priority to U.S. Provisional Application Ser. No. 60/645,624, filed Jan. 20, 2005, entitled "Method and System for Providing Free Directory Assistance in a Telephone System," the disclosure of which is incorporated herein by reference in its entirety.

The following three regular U.S. patent applications (including this one) are being filed concurrently, and the entire disclosures of the other two are incorporated by reference into this application for all purposes:

Application Ser. No. 11/250,743 filed Oct. 14, 2005, entitled "METHOD AND SYSTEM FOR PROVIDING INFORMATION AND ADVERTISING CONTENT IN A TELEPHONE SYSTEM";

Application Ser. No. 11/251,341 filed Oct. 14, 2005, entitled "METHOD AND SYSTEM FOR DETERMINING GENDER AND TARGETING ADVERTISING IN A TELEPHONE SYSTEM"; and Application Ser. No. 11/409,508 filed Oct. 14, 2005, entitled "METHOD AND SYSTEM FOR INTEGRATING INFORMATION FROM WIRELESS AND LANDLINE TELEPHONE SYSTEMS".

BACKGROUND OF THE INVENTION

The present invention relates generally to the field of telecommunications services. More particularly, the present invention relates to the delivery of advertiser supported directory assistance information. Merely by way of example, the method and apparatus of the present invention are used to provide a targeted message to incoming callers totally or substantially free of one or more 411-type directory assistance calling charges. The method and apparatus can be applied to other telecommunications services, for example, providing broader classes of information services and the like.

Standardized directory assistance systems emerged at least 40 years ago. Designed around common access codes (e.g., 411) such systems enabled callers to call and ask an operator for business and residential telephone numbers. Over much of the past four decades, these systems were available to consumer and business customers at no charge or a nominal charge. In recent years, prices have increased significantly. Today, the average price charged for landline 411 calls in the United States is approximately $0.80 for local look-ups and $1.25 for national queries. Cellular 411 calls are generally priced at $1.25 per call.

Therefore, there is a need in the art for improved methods and apparatus to provide directory assistance services at a reduced price.

SUMMARY OF THE INVENTION

According to the present invention techniques related generally to the field of telecommunications services are provided. More particularly, the present invention relates to the delivery of advertiser supported directory assistance information. Merely by way of example, the method and apparatus of the present invention are used to provide a targeted message to incoming callers totally or substantially free of one or more 411-type directory assistance calling charges. The method and apparatus can be applied to other telecommunications services, for example, providing broader classes of information services and the like.

In an embodiment of the present invention, a method of operating a telephony system is provided. The method includes receiving a call from a caller in which the call is provided through at least a telecommunication network. The method also includes receiving a phone number associated with the call from the caller. In embodiments of the present invention, the phone number is identified using a caller identification process. The method further includes determining if the phone number is associated with a wireless telecommunications device and prompting the caller to input a residential phone number for a landline associated with the caller if the phone number is associated with the wireless telecommunications device. The method additionally includes transferring the residential phone number from the caller using a communications process, receiving the residential phone number, and storing the residential phone number in association with the phone number into one or more memory locations of one or more databases.

In another embodiment of the present invention, a method of operating a directory assistance process adapted to provide a target message to incoming callers totally or substantially free of one or more 411-type directory assistance calling charges is provided. The method includes receiving a phone call from a caller in which the call is provided through at least a telecommunication network. The method also includes receiving a voice based request for information associated with directory assistance from the caller through at least the telecommunication network and determining phone number information in response to the request through one or more first databases. The phone number information is associated with the information associated with directory assistance.

The method additionally includes identifying a phone number associated with the phone call from the caller using a caller identification process and determining if the phone number is associated with a wireless telecommunications device. Moreover, the method includes prompting the caller to input a residential phone number for a landline associated with the caller if the phone number is associated with the wireless telecommunications device and transferring the residential phone number from the caller using a communications process. Furthermore, the method includes receiving the residential phone number, storing the residential phone number in association with the phone number into one or more memory locations of one or more databases, transmitting at least one message to the incoming caller through at least the telecommunication network and transmitting the phone number information to the incoming caller through at least the telecommunication network while the incoming call is totally or substantially free from one or more 411-type directory assistance charges.

In yet another embodiment of the present invention, a method of operating a telephony system is provided. The method includes receiving a call from a caller. In embodiments of the present invention, the call is placed from an Internet-based voice communications system. The method also includes recording a first identifier associated with the call and querying at least one database to ascertain a match between the first identifier and the caller. In a specific embodiment, the first identifier is an Internet protocol address. In another specific embodiment, the first identifier is a user chat name.

The method further includes prompting the caller to input a second identifier if querying the at least one database does not ascertain a match and transferring the second identifier from the caller using a communications process. In a particular embodiment, the second identifier is a residential landline phone number. The method additionally includes receiving the second identifier and storing the second identifier in association with the first identifier into one or more memory locations of one or more databases.

In an alternative embodiment of the present invention, a system for facilitating communication is provided. The system includes a memory and a processor coupled to the memory. The processor is adapted to receive a call from a caller in which the call is provided through at least a telecommunication network. The processor is also adapted to identify a phone number associated with the call, determine if the phone number is associated with a wireless telecommunications device, and prompt the caller to input a residential phone number for a landline associated with the caller if the phone number is associated with the wireless telecommunications device. The processor is further adapted to receive the residential phone number from the caller using a communications process, and store the residential phone number in association with the phone number into one or more memory locations of the memory.

In another alternative embodiment of the present invention, a computer program product stored on a computer-readable storage medium for facilitating communications is provided. The computer program product includes code for receiving a call from a caller. The call is provided through at least a telecommunication network. The computer program product also includes code for identifying a phone number associated with the call and code for determining if the phone number is associated with a wireless telecommunications device. The computer program product further includes code for prompting the caller to input a residential phone number for a landline associated with the caller if the phone number is associated with the wireless telecommunications device, code for transferring the residential phone number from the caller using a communications process, code for receiving the residential phone number, and code for storing the residential phone number in association with the phone number into one or more memory locations of one or more databases.

In yet another alternative embodiment of the present invention, a method of using a directory assistance system adapted to provide a targeted message to a caller totally or substantially free of one or more 411-type directory assistance calling charges is provided. The method includes placing a phone call from a wireless communications handset. The call is placed by the caller through at least a telecommunication network. According to embodiments of the present invention, a phone number associated with the wireless communications handset is identified using a caller identification process. The method also includes providing a voice based request for information associated with directory assistance through at least the telecommunication network. In embodiments of the present invention, phone number information and the targeted message are determined in response to the voice based request utilizing one or more databases.

The method further includes inputting a residential phone number for a landline associated with the caller. The residential phone number is transferred from the wireless communications handset utilizing at least the telecommunication network and the residential phone number is stored in association with the phone number into one or more memory locations of one or more databases. The method additionally includes receiving the targeted message at the communications handset utilizing at least the telecommunication network and receiving the phone number information at the wireless communications handset utilizing at least the telecommunication network.

In a particular embodiment of the present invention, a system for operating a telephony system is provided. The system includes one or more servers having an input handler. The input handler is adapted to receive a call from a caller in which the call is provided through at least a telecommunication network. The system also includes a processor adapted to receive a phone number associated with the call from the caller. The phone number is identified using a caller identification process. The processor is also adapted to determine if the phone number is associated with a wireless telecommunications device.

The system also includes one or more servers having an output handler. The output handler is adapted to prompt the caller to input a residential phone number for a landline associated with the caller if the phone number is associated with the wireless telecommunications device. The system further includes one or more databases coupled to the processor. According to embodiments of the present invention, the input handler is further adapted to receive the residential phone number from the caller using a communications process. Moreover, according to embodiments of the present invention, the processor is further adapted to store the residential phone number in association with the phone number into one or more memory locations of the one or more databases.

Many benefits are achieved by way of the present invention over conventional techniques. For example, embodiments of the present invention provide support for real time synthesis of caller specific information with caller profiles. Additionally, some embodiments of the present invention enable the probabilistic targeting of advertising content in situations in which the actual identity of the caller is unknown. Moreover, the methods and systems provided by embodiments of the present invention utilize data identified, generated, and/or maintained for productive utilization of marketing expenditures. Furthermore, embodiments of the present invention provide improved call routing during provision of directory assistance services and thereby an enhanced caller experience. Depending upon the embodiment, one or more of these benefits, as well as other benefits, may be achieved. These and other benefits will be described in more detail throughout the present specification and more particularly below in conjunction with the following drawings.

BRIEF DESCRIPTION OF THE DRAWINGS

FIG. 2 is a simplified database schema illustrating selection criteria used in determining a message to transmit to an incoming caller according to an embodiment of the present invention;

FIG. 6 is a simplified database schema depicting gender selection criteria used in determining a message to transmit an incoming caller according to an embodiment of the present invention;

FIG. 8 is a simplified database schema depicting the use of a wireless telephone number and a residential landline telephone number in determining a message to transmit an incoming caller according to an embodiment of the present invention;

FIG. 10 is a simplified database schema depicting identifiers, codes and their associated values according to an embodiment of the present invention;

FIG. 11 is a simplified database schema depicting routing steps associated with one or more codes according to an embodiment of the present invention;

DETAILED DESCRIPTION OF SPECIFIC EMBODIMENTS

Figure 1:
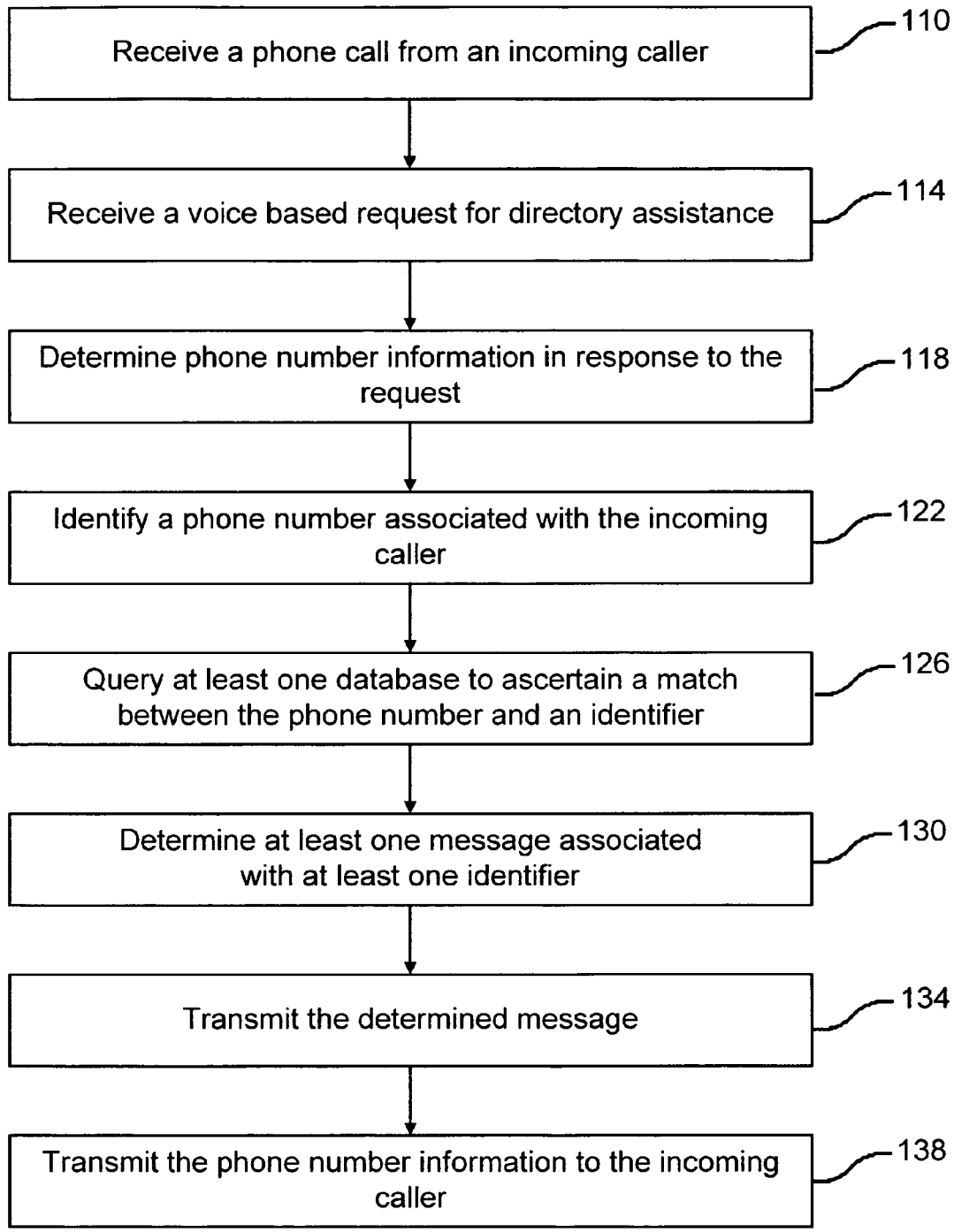
FIG. 1 is a simplified flow diagram illustrating a process for determining a message to transmit to an incoming caller according to an embodiment of the present invention.

According to the present invention techniques related generally to the field of telecommunications services are provided. More particularly, the present invention relates to the delivery of advertiser supported directory assistance information. Merely by way of example, the method and apparatus of the present invention are used to provide a targeted message to incoming callers totally or substantially free of one or more 411-type directory assistance calling charges. The method and apparatus can be applied to other telecommunications services, for example, providing broader classes of information services and the like.

Advances in the field of marketing have helped advertisers to identify and cater to consumer as well as business customers based on a host of different identifying criteria. As a result, advertising messages geared to identified target market(s) generally result in more efficient use of advertising resources.

Marketers today have tools to identify and understand existing and prospective customers. Where the market includes consumers, customer profiling can encompass demographics, psychographics, purchasing preferences, and buying behaviors. For business customers, profiling can include variables such as the type of business, the number of employees, sales size, the dollar volume of purchases, the number of years in operation, and other characteristics.

For both consumer and business categories of customers, customer identification facilitates direct marketing to those particular individuals/households or businesses. Marketing strategies customized for these entities allow for one-to-one marketing, whether business-to-consumer or business-to-business. Some marketing methods utilize predictive models that assign cluster-profiles at the household level. These models enable firms to classify household clusters according to psychographic and geo-demographic variables as well as prior purchase patterns. As a result, it is common for large companies to allocate and expend substantial resources related to researching and maintaining their data on past, current, and prospective customers.

The use of the telephone to transmit advertising messages is widespread especially as it relates to telemarketing, or to businesses advertising to call-in customers while "on hold." Whereas, telephone systems have been extensively used for telemarketing, the recent "Do Not Call Registry" will affect the use of this advertising medium. Already some 80,000,000 telephone numbers have been listed on the registry and marketers who use the telephone as a marketing tool are seeking new approaches to reach potential customers. A directory assistance system in which callers are provided with an opportunity to respond to an advertiser's message represents a possible communication strategy.

Information services are available that relay advertising messages to callers. Providers of these services select advertisements that are played to a caller from a cache of advertisements. The advertisement selection process generally uses demographic proxies such as an area code to select the advertisement.

Present industry conditions offer a viable motivation for callers to listen to an advertisement in order to avoid the relatively high costs associated with directory assistance services. Simultaneously, market place conditions facilitate interest on the part of marketers to pay to communicate their advertising messages on a voluntary opt-in basis, using the telephone as a marketing channel. Finally, methodologies utilizing ANI matching allow the system operator to identify the caller, query local or remote databases, and match such callers with an advertiser interested in communicating an appropriate marketing message.

Figure 15A:
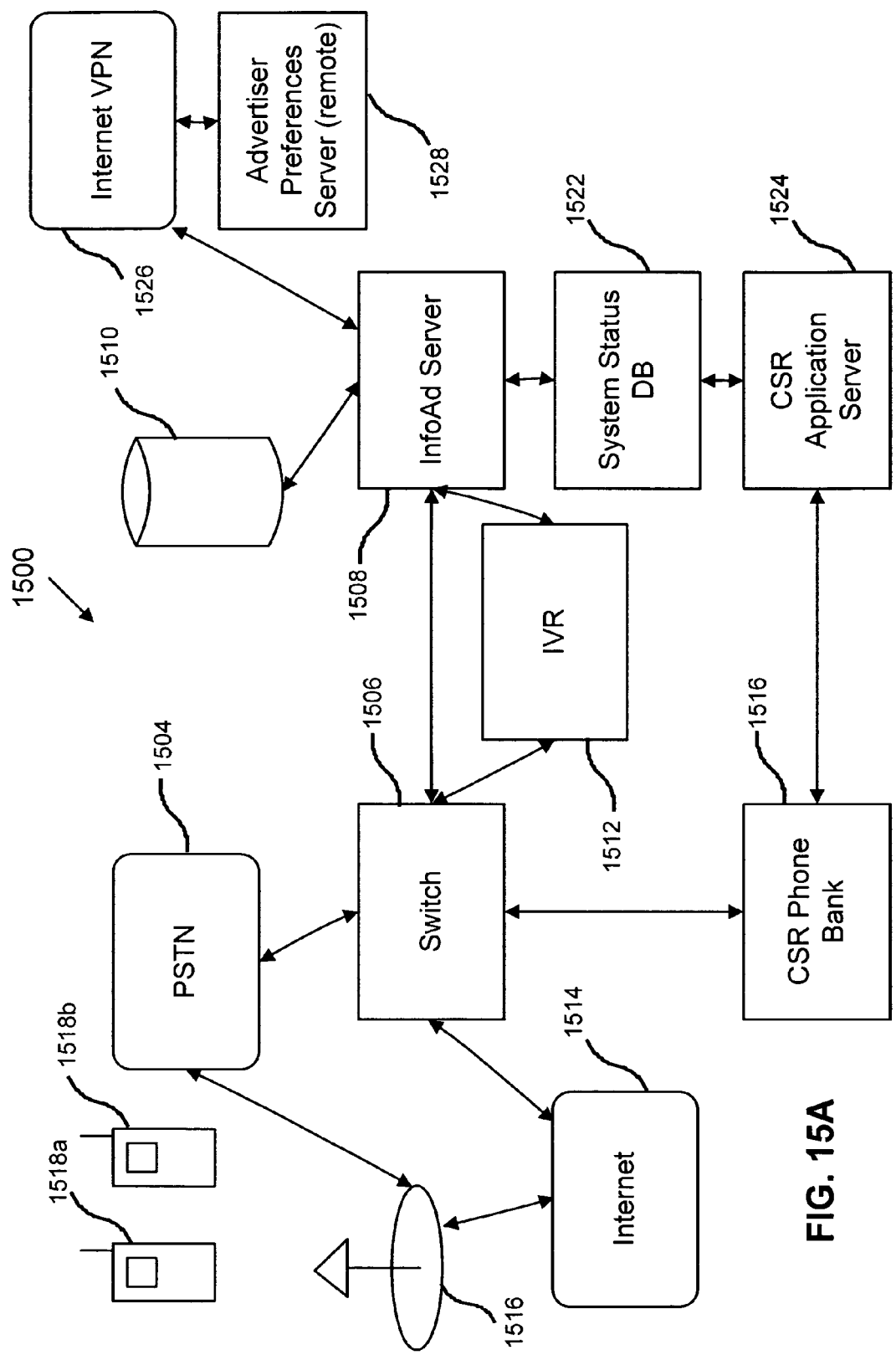
FIG. 15A is a simplified schematic illustration of a directory assistance system according to an embodiment of the present invention.

FIG. 15A is a simplified schematic illustration of a directory assistance system according to an embodiment of the present invention. As illustrated in FIG. 15A, system 1500 includes a switch 1506 coupled to the public switched telephone network (PSTN) 1504. Also illustrated in FIG. 15A is a wireless telephone network 1516 along with exemplary wireless handsets 1518a and 1518b. As will be evident to one of skill in the art, the number of handsets is not limited to the two illustrated in FIG. 15A. Moreover, additional elements of both the PSTN and the wireless network are omitted for purposes of clarity.

Switch 1506 is coupled to an interactive voice response (IVR) system 1512, which is coupled to an InfoAd Server 1508. The InfoAd server is coupled to a number of databases, including the database 1510, the System Status database 1522, and/or additional databases, including a Supplemental Information database, a Session History database, an Adbertiser Preferences database, not illustrated for purposes of clarity. The InfoAd Server 1508 is also coupled to the IVR 1512. In the embodiment illustrated in FIG. 15A, the System Status database 1522 is coupled to the customer service representative (CSR) Application Server, which is coupled to the CSR Phone Bank.

As further illustrated in FIG. 15A, the InfoAd Server is coupled to an Internet VPN 1526, which is coupled to an Advertiser Preferences Server 1528. In some embodiments, the Advertiser Preferences Server is located at a remote location with respect to other elements of the system. Additionally, in some embodiments, the wireless network is coupled to the Internet 1514. The internet, among other purposes, facilitates transfer of data from the wireless network to the system, including to Switch 1506.

Figure 15B:
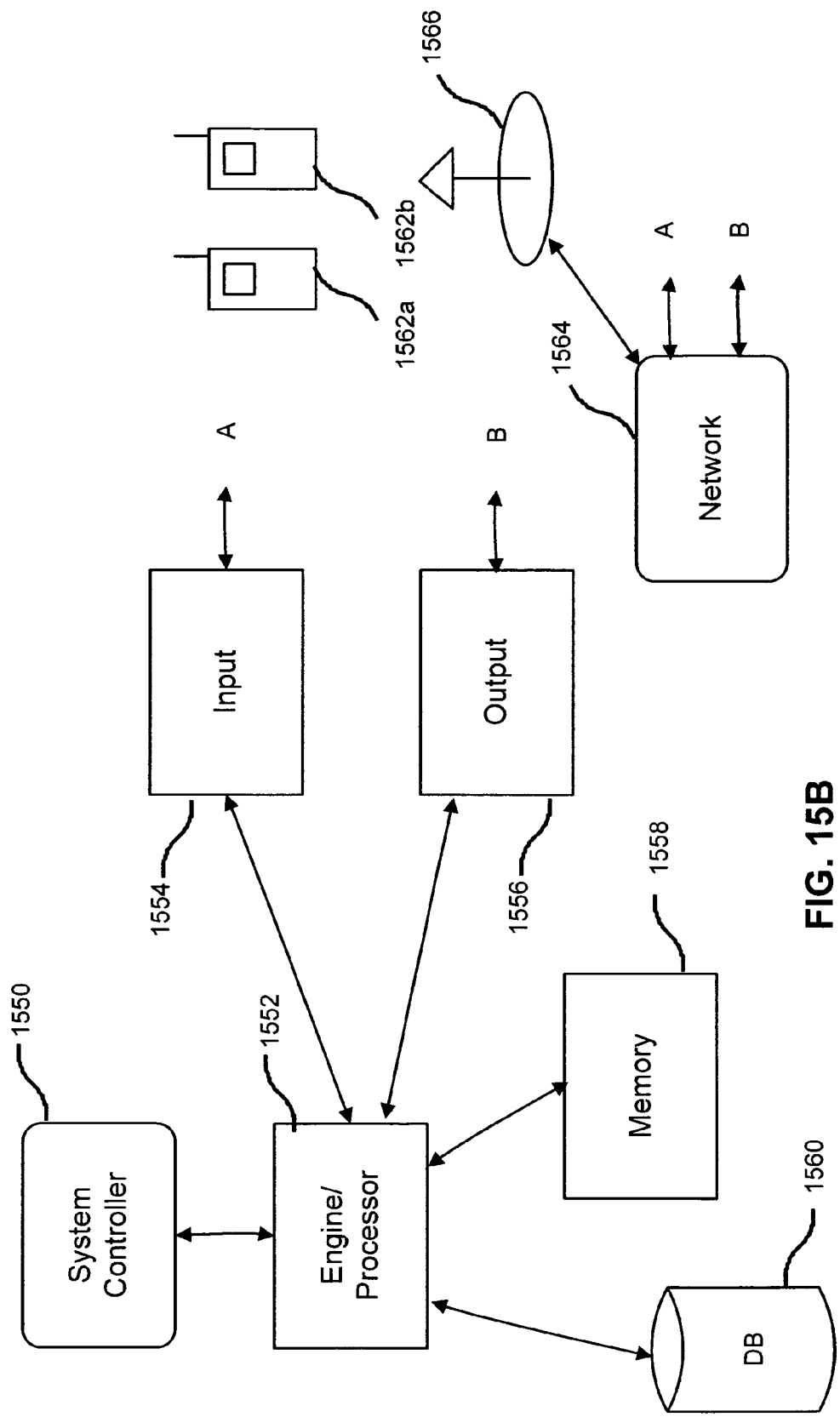
FIG. 15B is a simplified schematic illustration of an alternative directory assistance system according to another embodiment of the present invention.

FIG. 15B is a simplified schematic illustration of an alternative directory assistance system according to another embodiment of the present invention. As illustrated in FIG. 15B, an engine/processor 1552 is coupled to a system controller 1550. Additionally, the engine/processor 1552 is coupled to an input handler 1554 and an output handler 1556 to facilitate the transfer of information in and out of the system. One or more databases 1560 and/or one or more memories 1558 are coupled to the engine/processor 1552 to provide storage and retrieval of data used by the system.

A network 1564, for example, the Internet, is coupled to the input handler 1554 and the output handler 1556. Additionally, a telephone network, illustrated by a wireless network 1556 and a plurality of wireless handsets 1562a and 1562b, is provided according to embodiments of the present invention. Although a wireless network is illustrated in FIG. 15B, this is not required by the present invention. In other embodiments, a PSTN or a combination system including both wired and wireless handsets is included within the scope of the present invention.

FIG. 1 is a simplified flow diagram illustrating a process for determining a message to transmit to an incoming caller according to an embodiment of the present invention. Generally, FIG. 1 is applicable in a context of a method for operating a directory assistance process adapted to provide a targeted message to incoming callers substantially free of one or more 411-type directory assistance calling charges. According to some embodiments of the present invention, substantially free means that the cost to the caller is either zero or significantly lower than the average price today that carriers charge their users to call 411. For example, many carriers today charge between $0.50 and $1.50 per call; in some embodiments of the present invention, the price charged to callers is less than $0.50. In alternative embodiments, the price charged to callers is less than $0.25. In other embodiments, the price charged to callers is zero. As described more fully below, the presence of advertiser sponsored advertisements defrays a substantial portion of the cost of providing the service.

FIG. 1 illustrates an example of a system for a receiving directory assistance phone call and dynamically matching one or more advertisements and/or other information with information related to the caller. As described more fully below, some embodiments of the present invention provide information associated with the caller's phone number to enhance an advertisement selection decision. Other embodiments compare the information associated with the caller's phone number to locally stored advertiser preferences (typically pre-specified) to develop an advertisement selection decision. Referring to FIG. 1, a phone call is received from an incoming caller (110). In general, the caller initiates contact with the system by dialing a toll-free number, such as 1-800-411-SAVE. Some embodiments of the present invention receive directory assistance calls through a local telephone number. One of ordinary skill in the art would recognize many variations, modifications, and alternatives. In some embodiments, the phone call is received through a phone Switch, which receives calls from the Public Switched Telephone Network (PSTN). As will be evident to one of skill in the art, a semantically equivalent analogue such as a Voice over Internet Protocol (VOIP) network may also be used according to embodiments of the present invention.

A voice based request for directory assistance is received from the caller (114). In some embodiments, the directory assistance request is for a phone number associated with a particular business. In other embodiments, the directory assistance request is for a phone number associated with a particular person or family. In a specific embodiment, the directory assistance request is a category request. A category request is a request in which the caller specifies a category of business. In still other embodiments, the directory assistance request is a general information request. A general information request is one in which the caller requests information pertaining to weather, stock quotes, other topics of particular interest to the caller, and/or the like.

As illustrated in FIG. 1, the directory assistance request is a voice based request, generally including a verbal request by the caller. In some embodiments, the voice based request is processed by a customer service representative (CSR). In a typical call center, one or more phone banks of Customer Service Representatives (CSRs) handle interactions with users. The phone banks may include computers that the CSRs use to manage their calls, including a customer service application served from a CSR Application Server. Additionally, the phone banks may include a switch in contact with one or more other servers that enable the CSR who receives a call to also view that caller's information on a computer screen accessible to the CSR. The CSR Application Server usually provides a user interface for CSRs to use. CSRs using this application can receive information that corresponds to the session currently being handled by the CSR. Some embodiments of the present invention are designed to provide a web-based CSR interface. Additionally, other embodiments are designed to provide a "thick client" user interface or other form of application/server layer model depending on the performance and user interface requirements of a particular application.

In other embodiments, receiving a voice based request (114) is handled through an interactive voice response (IVR) unit. As will be evident to one of skill in the art, an IVR server handles automated interaction with callers.

In step 118 of FIG. 1, phone number information is determined in response to the request. Generally, the phone number information is a business phone number, a residential phone number, a business name and/or address, a residential name and/or address, a stock quote, or the like. In some embodiments, the CSR accesses a database of directory assistance information through a desktop computer system. In other embodiments, speech recognition systems are utilized to determine the phone number information through an automated process. In some cases, the phone number information cannot be determined; for example, in a situation where a caller is requesting an unlisted residential number, the operator or automated system would indicate that the phone number information is not presently available.

Referring once again to FIG. 1, the phone number associated with the incoming caller is identified (122). Generally, the phone number associated with the incoming caller is the phone number from which the caller has placed the call. For example, if a call is placed from a residential landline, preferably, the phone number of the landline will be identified. Additionally, if a caller places the directory assistance call from a wireless or mobile telephone (e.g., a cellular telephone), preferably, the phone number of the mobile telephone will be identified. If a call is routed through a PBX, generally, the phone number associated with the incoming caller will be at the trunk level. In some embodiments, identifying the phone number associated with the incoming caller is accomplished using an Automatic Number Identification (ANI) method. As will be evident to one of skill in the art, other methods of identifying the phone number associated with the incoming caller are included within the scope of the present invention.

In step 126, at least one database is queried to ascertain a match between the phone number associated with the incoming caller and an identifier. In some embodiments, the identifier is itself a phone number. Thus, in a specific embodiment, the phone number previously associated with the incoming caller (122) is matched with the identical number, if present, in a database. As described more fully below, embodiments of the present invention provide methods and systems to identify a caller and provide targeted advertising to the caller based, in part, on the caller identification process. Thus, embodiments of the present invention provide advertisers with a means to provide appropriate advertising messages to individuals or households.

Referring to FIGS. 1 and 2, at least one message associated with the identifier is determined (130). FIG. 2 is a simplified database schema illustrating selection criteria used in determining a message to transmit to an incoming caller according to an embodiment of the present invention. In the database illustrated in FIG. 2, there are six rows (220, 224, 228, 232, 236, and 240), each of which represents a record in the database. The database also contains four columns (204, 208, 212, and 216), each of which contains a label characterizing the type of data contained in the column. Thus, as illustrated in FIG. 2, record 240 has an identifier (244), a message (248), a first selection criteria (252) and a second selection criteria (256). For record 240, the identifier 244 is 650-349-3996, a local phone number. Thus, the identifier in this example is itself a phone number. In other embodiments, other identifiers are utilized, including numeric codes or the like. The columns illustrated in FIG. 2 are provided merely by way of example. Additional columns are utilized in alternative embodiments, thereby providing additional selection criteria, messages, and the like.

By way of example, record 240 illustrates a situation where message 17 is associated with identifier 650-349-3996. Generally, the process of determining the at least one message involves utilization of the selection criteria provided in the database 200. As illustrated in FIG. 2, only two selection criteria 212 (gender) and 216 (time of day of the directory assistance call) are provided in database 200. As will be evident to one of skill in the art, additional selection criteria are utilized in alternative embodiments. Merely by way of example, the caller's request, the geographic area from which the call originates, the geographic area associated with the request, demographic characteristics, psychographic characteristics, the incoming caller's purchasing patterns, the caller's history of system usage, and the like, may be utilized as selection criteria. In some cases the information that is compared to the selection criteria, for example, the time of day, will be known. In other cases, the information compared to the selection criteria will be inferred through the use of data compiled from information provided by consumers or businesses or projected from variables based on such information. Information pertaining to the call (e.g., the incoming phone number) is matched to information in the database 200 or other databases.

Utilizing the selection criteria provided in the database 200, at least one message will be selected in some embodiments. Generally, through the use of database 200 and the methods and apparatus described more fully below, transmitting the determined message includes providing an advertisement targeted to the particular caller requesting directory assistance. As illustrated in FIG. 2, some embodiments of the present invention utilize a reference to a message, such as "17" (248); whereas in other embodiments the database contains the actual message file. In some embodiments, as will be described more fully below, the message is determined in real-time on the basis of information available in real-time about the present caller, the call, the time of the call, the day of the week, and the like. In other embodiments, the message is determined off-line (e.g. ahead of time).

As an example of the use of database 200, an incoming call is received from phone number 650-814-8237. As illustrated in records 220 and 224 of FIG. 2, the identifier 650-814-8237 is associated with two messages, the messages referenced by numbers 23 and 24. In order to determine which message to associate with the identifier, the selection criteria of the gender of the caller and the time of day at which the call was received are utilized. Merely by way of example, the advertiser associated with message 24 is Ladies Home Journal®, which has expressed a preference for its message to be broadcast to female callers (selection criteria 1 (212)). In a situation where the caller is determined to be female, message 24 will receive priority over message 23. As another example, the advertiser associated with message 23 is a boxing magazine, with a largely male readership. If the caller is a male, message 23 will receive priority over message 24. For records 220 and 224, there is no preference given to the time of day, as both records specify morning hours for section criteria 2 (216).

Referring to records 236 and 240, the gender preference for both advertisers associated with messages 15 and 17 is for a male caller. However, these advertisers have a preference for morning or afternoon. Merely by way of example, the advertiser associated with message 15 could be a restaurant, interested in providing advertisements related to lunch and dinner specials. Accordingly, this advertiser places a priority on communicating their advertisements to callers who place directory assistance calls in the morning hours. On the other hand, the advertiser associated with message 17 could be a bar or nightclub, with a preference for callers who are placing directory assistance calls in the afternoon and evening. One of ordinary skill in the art would recognize many variations, modifications, and alternatives. Of course, the categorization of the selection criteria 2 (216) into the hours before and after noon is merely provided by way of example. The use of more narrowly defined time periods, and a number of time periods are provided in other embodiments as appropriate to the particular application. For example, in some embodiments, certain messages are only transmitted during the hours in which the advertising sponsor is open for business.

As will be evident to one of skill in the art, and as described more fully below, the use of selection criteria in determining at least one message associated with the at least one identifier is not limited to the binary selection criteria as described above. One of skill in the art can envision weighted values associated with one or more selection criteria, thereby utilizing a number of selection criteria in performing the determination illustrated in step 130 of FIG. 1.

Referring once again to FIG. 1, the determined message is transmitted to the caller (134). In some embodiments, the transmission occurs over the telephone line through which the incoming call is received and occurs in an aural manner through either a human operator or an IVR. In other embodiments, the transmission occurs via SMS, email, other electronic means, and the like. For example, in environments where the caller is requesting information via a telephone with multimedia capabilities, the determined message can be transmitted in a single SMS message, or similar message format, to the handset. Alternatively, the message can provide a link to a web page or similar data service that provides a detailed answer to the caller's request. As will be evident to one of skill in the art, the visual display is not limited to SMS or email techniques as described above, but can be achieved with any asynchronous or real-time interactive visual communication system.

The phone number information is transmitted to the incoming caller (138) and the directory assistance call is typically terminated. In some embodiments the phone number information is transmitted by way of an operator verbally speaking the phone number information to the caller. In other embodiments, the phone number information is transmitted by way of an automated process involving either aural or visual communication means. As described in reference to step 118 above, in some embodiments, phone number information is a business phone number, a residential phone number, a business name and/or address, a residential name and/or address, weather information, a stock quote, product reviews, business reviews, or the like.

As described above, particular embodiments of the present invention provide methods and apparatus utilized in the context of a voice response scenario. However, this is not required by the present invention. For example, a number of other related scenarios are included in alternative embodiments of the present invention. Mobile phone users on high speed data networks (e.g., "3G") may be presented with a video advertisement, or presented with choices or Affirmative Actions, as described more fully below, by way of an interactive interface on their handset. Mobile phone users may receive their search results via electronic form. Current examples of electronic forms include the Short Message System (SMS) and email. One having ordinary skill in the art will appreciate that the advertisement content could be both aural as well as visual including, but not limited to broadcasting messaging content to the user's cell phone display or embedded ad links that the cell phone user could select to generate a phone call to the advertiser. Users on new voice over IP (VoIP) networks may be presented with options which result in further routing to applications on an IP network rather than merely using IP as a proxy for voice transit on the PSTN.

Though these optional examples may use different protocols than those described above, the above scenarios are based on currently available technology. Moreover, it is expected that the ongoing increase in data and voice convergence will stimulate market demand for the delivery of the InfoAd service in related manifestations via different user interfaces. One having ordinary skill in the art will appreciate that the system framework disclosed herein can be adapted to such emerging uses.

As mentioned above, step 130 as illustrated in FIG. 1 occurs in the context of multiple elements and system components. In some embodiments, a number of general components are related to the process of determining the at least one message associated with the at least one identifier. Generally, the switch speaking to the PSTN supports SS7 signaling or a protocol with similar semantics, and the ability to communicate ANI, ANI-II and DNIS information or analogous information into a computer and/or computer process.

In some embodiments of the present invention, a computer and/or computer process is referred to as an InfoAd server. As described below, the InfoAd server generally performs several functions including directing call flow and collating call session information from the network. Collation of such call session information is stored, in some embodiments, in a database referred to as the Session History Database. Additional typical functions for the InfoAd server are performing the function of using the session information, querying databases including, for example, the local Advertiser Preferences Database, described more fully below, and remote Advertiser Preferences Servers, arbitrating between multiple possible matching advertisements, directing the IVR to play a specific advertisement, and/or to monitor any Affirmative Actions, as described below.

Where the external network is not a traditional (i.e. "plain old telephone service" (POTS)) network, the switch would support semantically equivalent protocol functionality. In addition, some embodiments of the present invention provide for a hot-failover capability, clustering handled at the application layer, and one or more database servers being ACID compliant. According to embodiments of the present invention, a standard SQL database is employed, but for performance reasons, it may be desirable to use an object database. One of ordinary skill in the art would recognize many variations, modifications, and alternatives.

According to embodiments of the present invention, the InfoAd server is run as a commodity multitasking operating system with protected memory (e.g. Linux, Windows NT, and the like).

According to embodiments of the present invention, the actual choice of advertisements (see step 130 of FIG. 1) is based on algorithms which use inputs from the system and the preferences specified by advertisers. Typically, advertisers determine their Preferences, and either submit them in a format acceptable to the InfoAd system, or provide a server which answers queries, thereby providing a list of advertisements to transmit to the caller. In one sense, the InfoAd Server queries the Advertiser Preferences components, which return lists. Subsequently, the lists are arbitrated.

The Advertiser Preferences Database is a typically a local database containing advertisements, key-value pairs of desired Session Model characteristics, and a list of rules for weighting advertisements based on one or more Session Model characteristics. The Session Model is generally created by aggregating information collected during the directory assistance call. In some embodiments, the Advertiser Preferences Database is queried via a standard database query using the available key value pairs. For example, the following pseudo-code illustrates a simple SQL query. It should be noted that any additional information would be added to the query in the [ . . . ] area.

SELECT advertisement.id, advertisement.action, advertisement.matchtype
WHERE advertisement.id=qualities.adid AND (qualities.phone='$ANI' OR qualities.dnis='$DNIS' OR qualities.probsex='$PROBABLESEX' OR qualities.probsexprob='$PROBSEXODDS' OR qualities.inforequesttype='$DIRECTORYCATEGORY' OR [ . . . ]);
SELECT advertiser.rules WHERE advertiser.id=advertisement.advertiserid ORDER BY priority;

The first query will return a list of advertisements that match the Session Model. The second query will return a set of Rules which are used to sort the results of the first query. In the initial implementation, the Rules are returned as an ordered list (ordered by priority) of fields and field combinations, e.g. ("ANI", "NPANXX and INFOREQUESTTYPE"). For each advertiser, this list is traversed, and the first advertisement matching a field is selected. For example, in the case above, if there existed an advertisement which matched by ANI, that advertisement would be selected. If there were no advertisements that matched by ANI, but one matching both NPANXX and INFOREQUESTTYPE, that advertisement would be selected. If neither of these conditions is met, no advertisement would be selected.

For the remote case, a direct database query is generally not used. Instead, the Session Model data is typically placed in an XML formatted API request delivered via an HTTP request to the Advertiser Preferences Server. The Remote Advertiser Preferences Server returns the list of advertisements and the list of Rules in XML formatted documents. Because, in remote applications, advertisers generally provide responses that comply with the InfoAd XML API.

In some embodiments, advertisers provide ANIs directly in order to advertise to specific callers. In these embodiments, the advertisement selection process is performed as in other searches. For example, if a call came from a male, looking for an Italian restaurant, calling from 650-555-1234, the query to the database could look like the following pseudocode:

SELECT advertisement.id, advertisement.action WHERE
advertisement.id=qualities.adid AND
(qualities.phone='6505551234' OR
qualities.probsex='M' OR
qualities.inforequesttype='Restaurants/Italian');

Generally, advertisers wanting to match an advertisement to a particular ANI will provide a table with the format illustrated in Table 1.

TABLE 1

| Phone | AdId |
|---|---|
| 650-555-1234 | 3546 |
| 408-555-1876 | 3547 |
| Etc. | Etc. |

In addition, the advertiser would generally include rows in the advertisement table with the format illustrated in Table 2:

TABLE 2

| AdId | Action | Matches |
|---|---|---|
| 3546 | Null | ANI |
| 3546 | Null | NPANXX and INFOREQUESTTYPE |

Because the advertiser is primarily interested in ANI matches, its Advertiser rules would generally have the format illustrated in Table 3.

TABLE 3

| Priority | Rule |
|---|---|
| 1 | ANI |
| 2 | NPANXX and INFOREQUESTTYPE |

The initial query would match AdId 3546, which matches for "ANI" and for "NPANXX and INFOREQUESTTYPE." The rules query indicates that the advertiser first prefers ANI matches, and since AdId 3546 has an ANI match, the advertisement is matched, and the match is complete for that advertiser.

If the advertiser were using an Advertiser Preferences Server instead of providing information for the Advertiser Preferences Database, the above method would be modified—the Session Model would be passed to the advertiser and an advertisement for transmission would be received in return. In this example, there would be no visibility into what decision process was used by the Advertiser.

In other embodiments, advertisers provide general rules involving targeted customer characteristics. For these situations, a Supplemental Information Database will be used in determining (step 130 of FIG. 1) the advertisement selected for transmission. Generally, the Supplemental Information Database includes information regarding consumers or businesses. Typically, each individual record will contain a phone number field. Accordingly, embodiments provide for the matching of the ANI with the record containing that phone number to make a probabilistic determination of the caller's relevant characteristics. The Advertiser Preferences Database is queried using a query constructed using information from the Session Model. For example, the query, in a specific embodiment, is:

SELECT advertisement.id, advertisement. action WHERE
advertisement.id=qualities.adid AND
(qualities.phone='6505551234' OR
qualities.education='somecollege');

In yet other embodiments, advertisers using the Advertising Preferences Database provide less restrictive rules or provide advertisements that match all calls (e.g. "transmit to all callers"). These situations will likely result in the advertisement entering the arbitration process against other advertisements. Because many Sessions will result in advertisers requesting multiple possible advertisements, and multiple advertisers requesting advertisements, the system may provide for arbitration between the advertisements and selection of a single advertisement for transmission to the caller. For example, in a specific embodiment, the arbitration process uses an Expected Value Calculation:

$$EV = P(\text{paid for this advertisement}) \times V, \text{ where}$$

EV is the expected value of the advertisement, P(paid for this advertisement) is the probability of getting paid for this advertisement, and V is the value of a payout for the advertisement For example, one advertisement pays $0.10 every time it is played, (i.e, EV is $0.10). A second advertisement only pays when the user takes an Affirmative Action, for example, opting to contact the advertiser after receiving the requested directory assistance information. The advertiser pays $2.00 for the Affirmative Action, and this Session Model estimates a 10% probability that the caller will take the action, i.e, EV is equal to 0.1×$2.00=$0.20. Comparing the above two advertisements, the second advertisement would be selected if the Expected Value Calculation is used.

In general, an expected probability of success is used based on previously observed behavior with regard to affirmative actions associated with the caller/origination phone number, statistical inferences regarding click through behavior drawn from the caller's predicted cohort group, and the type of information the caller is requesting. In situations in which the expected probability of success for a given advertisement is not known, the system will substitute the historic average for similar situations in which insufficient information is available.

Over time, data mining of the Session History Database will allow a weighting of the expected probabilities of success used in the arbitration algorithm. The database will be mined to identify relevant customer segments and any correlation between different customer characteristics and success ratios for different advertisements. These correlations may consist of standard statistical techniques including basic $\chi^2$, linear regression, logistic regression, or other tests as appropriate. While the algorithms for this are known, the proper analysis may be time consuming and processor intensive. Therefore, in general, these processes may be performed off-line and then the information used to inform the InfoAd server's real-time decision making.

It should be appreciated that the specific steps illustrated in FIG. 1 provide a particular method of providing directory assistance according to an embodiment of the present invention. Other sequences of steps may also be performed according to alternative embodiments. For example, alternative embodiments of the present invention may perform the steps outlined above in a different order. For example, the advertisement could be transmitted before the request for directory assistance is received. Moreover, the individual steps illustrated in FIG. 1 may include multiple sub-steps that may be performed in various sequences as appropriate to the individual step. For example, in step 130, determining at least one message generally includes a number of sub-steps, which may be performed in various sequences within the scope of the present invention. Furthermore, additional steps may be added or removed depending on the particular applications. One of ordinary skill in the art would recognize many variations, modifications, and alternatives.

Merely by way of example, possible user experiences are illustrated by the following three examples. These examples are not intended to limit the claims of the present invention, but merely to provide examples of the operation of a directory assistance system according to some embodiments of the present invention.

EXAMPLE 1

First, the caller dials a toll free number, for example, 1-800-411-SAVE. The caller is greeted with an automated voice prompt "You've reached 1-800-411-SAVE, the better way to search! Did you know that Bank of America now offers a VISA Platinum credit card with a fixed interest rate of 4.9%? Press pound to have details of this special offer sent to your email address on file." The Operator or an Automated voice then says, "What city and state please?" The caller responds, "Palo Alto, Calif." Operator or Automated voice says, "Are you looking for a business or residence?" The caller says, "Residence. I want the number of Jawdat." The Operator states, "Is it the Mr. Jawdat on Avenue A or Boulevard B?" The caller states, "Avenue A." The Operator states, "Thank you. Please hold." The caller hears, "Your 411 call was sponsored by ACME Corp. ACME now offers new users 3 months of free service. The number you requested is 650-321-9050. Now press star to hear more about your special offer!" Caller presses "star." The caller holds and then hears a live operator, "This is Bob from Acme Corp. May I tell you more about your special offer of 3 months free service?" As illustrated in this example, the message selection is accomplished in a manner that is not visible to the user, but which transmits the offer(s) of potential interest to the caller.

Example 2

The following example represents a typical user experience in which the user is calling for a particular business. The caller dials a toll free number such as 1-800-411-SAVE. The caller is greeted with an automated voice prompt "You've reached 800-411-SAVE, the better way to search! Did you know that Bank of America now offers a VISA Platinum credit card with a fixed interest rate of 4.9%? Press pound to have details of the special offer sent to your email address on file." The Operator or an Automated voice then says, "What city and state please?" The caller responds, "Palo Alto, Calif." The Operator or an Automated voice says, "Are you looking for a business or residence?" The caller responds, "Business." The Operator or voice prompt says, "Name the particular business or say the type of business." The caller says, "I want the Pizza Hut on Santa Cruz Avenue." The Operator states, "Checking . . . Please hold." After a short delay, the caller hears, "Your free call was sponsored by Domino's Pizza. Domino's now offers you $4.00 off every large pizza. The number you requested is 650-321-9050. Now press star to be connected to the nearest Domino's and hear more about your special offer!" As illustrated in this example, the message selection is accomplished in a manner that is not visible to the user, but which transmits the offer(s) of potential interest to the caller.

Example 3

The following example represents a typical user experience in which the user is calling for a business category. The caller dials a toll free number such as 1-800-411-SAVE. The caller is greeted with an automated voice prompt "You've reached 800-411-SAVE, the better way to search! Did you know that Bank of America now offers a VISA Platinum credit card with a fixed interest rate of 4.9%? Press pound to have details of the special offer sent to your email address on file." The Operator or Automated voice then says, "What city and state please?" The caller responds, "Menlo Park, Calif." The Operator states, "Business or residence?" The caller responds, "Business. I'd like a florist please." The Operator states, "Thank you. Please hold." After a short delay, the caller hears, "Your free call is sponsored by 1-800-FLOWERS. Connect now and get 15% off any order!" As illustrated in this example, the message selection is accomplished in a manner that is not visible to the user, but which transmits the offer(s) of potential interest to the caller.

As described above, the determination of the one of more messages relies on an analysis of various data entities and elements associated with the system. In some embodiments, these entities and elements include: the session, the session model, the user, the advertiser preferences, the advertisement, the customer characteristics, the InfoAd server, local advertiser preferences database, remote advertiser preferences database, advertisement database, session history database, supplemental information database, and the information requested database. The following discussion provides certain details related to particular implementations of embodiments of the present invention. In some implementations, particular details are implemented in different manners within the scope of the present invention. Thus, the following merely provides examples in which embodiments of the present invention are implemented.

A session is the context for a single call into the system, for the length of the call. When the caller hangs up, the Session is over. The Session Model is the aggregation of everything that is known about the Session.

The Session Model may be considered as a running list of data attached to the call, which an Advertiser can use to match the call to an Advertisement. It includes, but is not limited to: the phone number from which a call was placed (ANI), which represents a match in the case that an advertiser has pre-specified a phone number either in the Local Advertiser Preferences Database or Remote Advertiser Preferences Database. It also includes the phone number to which a call was placed (DNIS), which can narrow the possibilities if the inbound numbers are differentiated but use the same server network to handle the calls. Another element is the Area code and exchange (NPA-Nxx, derived from the ANI information) in the case where a user cannot be specifically identified but advertisers are willing to rely on customer characteristics matching as an approximation. It further includes calling number information (ANI II digits, from Flex-ANI), to catch special cases related to location (e.g. calling from a pay phone) or other circumstances which may involve special handling (e.g. calling from a cell phone).

The Session Model can also include Probable gender or age (based on analysis of the caller's voice). It also can include additional manually entered information (e.g. the home phone number of the caller, requested and matched from records when the call is from a wireless phone; the zip code or locality in which the user is looking for information, and the information the user is looking for). It also can include historical data about that phone number (e.g. prior purchase history, past action rates, etc.) and recorded in the Session History Database. It also can include additional information about that phone number, such information being provided by consumers or businesses or projected from such information and generally stored in the Supplemental Information Database. The Session Model object is the collection of information provided by advertisers either via the Advertiser Preferences Server or the Advertiser Preferences DB to determine what Advertisement to play. The Session Model does not generally explicitly identify the caller, but typically provides meaningful information to support the predictive matching process. Advertisers can tailor their Rules to attempt to match specific people, specific customer characteristics, or simply people looking for specific types of information.

A User is an individual making a phone call. A User may make multiple calls. The system is based around sessions rather than users. The system, may, however, track user information across sessions to build up a more accurate Session Model for future calls from the same user.

Advertiser Preferences, or Rules are the mechanism by which advertisers specify how to match an Advertisement against a Session, based on the Session Model. An Advertisement can be a specific sound file or multimedia message. In some embodiments, this message is a five to fifteen second sound file containing an advertisement. In some embodiments, the advertisement is combined with possible affirmative actions that a caller can take during or after the playing of the sound file. Generally, several deliverables are provided by Advertisers: Each advertiser typically provides the complete set of Advertisements, in the form of a sound/visual file (e.g., .wav, .mp3, or .aiff) and a description of any Affirmative Action results (e.g., a phone number to which a User's call will be directed if they press a button or speak during the length of the Advertisement). Each advertiser typically either provides a list of Advertiser Preferences in the supported format (see below) or provides a server at their premises which supports the InfoAd XML API and is accessible via a VPN connection from the InfoAd Server's premises (PPTP, IPSEC, SSL or SSH tunnel). The sound file for an Advertisement can be stored on the IVR for quick playback, while any Affirmative Actions a caller can take can be stored in the InfoAd server.

Customer characteristics, whether known or inferred, include any variable(s) relevant to the caller, including but not limited to those variables defining the demand determinants of the advertiser's target segment. For consumers, such variables include demographics (e.g. education, income, age, occupation, etc), geographic location, psychographics (e.g., activities, interests, opinions, etc.) and buying behavior (e.g., product knowledge, product usage, brand awareness and loyalty, and purchase activities) for products/services other than the telephone service. For business customers, demographics may include type and size of business (e.g., number of employees or revenue measures), age of business and buying behavior for products/services (other than the telephone service) purchased to sustain business operations. Other customer characteristics, whether known or inferred, could include one or more of the following: origination phone number determined by ANI, destination number, or DNIS, geographic location, predicted gender, predicted age, time of call, etc. In some cases this information will be known concretely by direct observation. In other cases, this information will be inferred through the use of databases compiled from information provided by consumers or businesses, or projected from such information, or from advertiser provided databases in which information pertaining to the call (e.g., the incoming phone number) is matched to information in the aforementioned databases. In some embodiments, the message is determined in real-time on the basis of all available information about the immediate caller, the call and the circumstances surrounding the call. In other embodiments, the message is determined off-line (e.g. ahead of time).

The Local Advertiser Preferences Database contains advertising matching rules submitted by advertisers. The Remote Advertiser Preferences Servers serve a similar purpose to the local Advertiser Preferences Databases, but are maintained by advertisers on their premises, and accessible via an XML-protocol network API. The Advertisement Database is typically a logical construct—a set of aural/visual advertisement files stored on the IVR, and an index of Advertisements stored on the InfoAd server. This index matches Advertisement IDs with the aural/visual files stored on the IVR, and is referenced by the Advertiser Preferences databases when returning the Advertisement to play. The Session History Database is a database that records past sessions and can be used to tie these to new calls. The results of a query of the Session History Database are multifaceted as are the Supplemental Databases. The Supplemental Information Database aggregates information that has been acquired to cross-index information on incoming sessions. The matching algorithm will typically involve an ANI match to the locally stored database. Various elements of information can be contained in the Supplemental Information Database.

The Information Requested Database contains all the information that callers would be calling to request, and may aggregate data from a variety of sources and/or may contain data developed internally.

Figure 3:
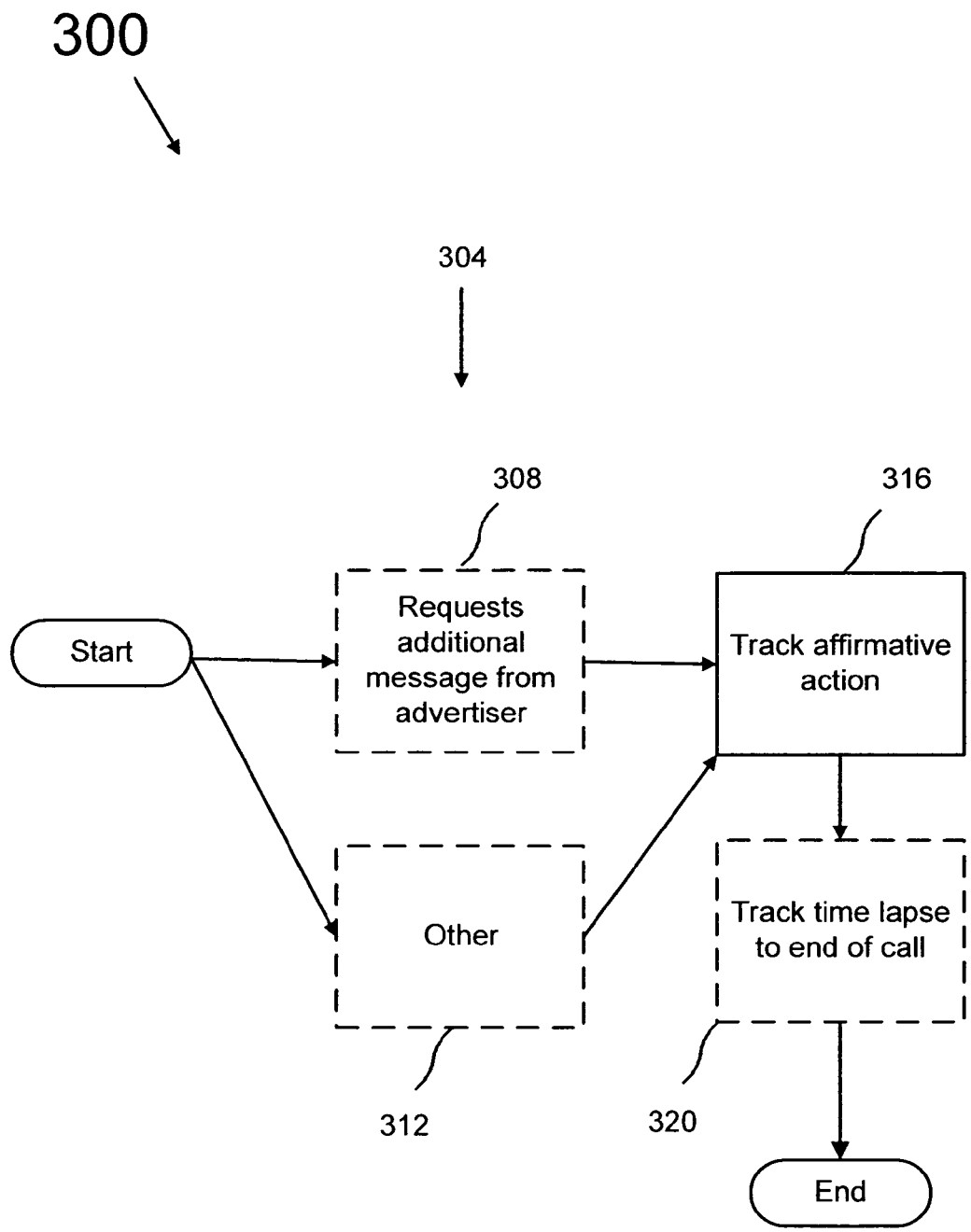
FIG. 3 is a simplified block diagram illustrating options available to callers and a process for tracking selected options according to an embodiment of the present invention.

FIG. 3 is a simplified block diagram illustrating options available to callers and a process for tracking selected options according to an embodiment of the present invention. In process 300, the caller selects an affirmative action represented by reference number 304. An affirmative action is some action the user takes with respect to their telephone device in the context of the directory assistance call after receiving one or more messages. For example in Example 1 discussed above, pressing the star button to hear more about the special offer is an affirmative action.

In some embodiments, this affirmative action is taken after the caller has made a directory assistance request and has been given the phone number information. In other embodiments, the affirmative action is taken once the caller has made the directory assistance request but before the caller has received the phone number information. In still other embodiments, the affirmative action is taken before either making the directory assistance request or after receiving the phone number information. In some embodiments, a number of different affirmative actions are possible as illustrated by the range of options available under reference number 304.

Step 308 illustrates one possible affirmative action. As shown in FIG. 3, the caller requests an additional message from the advertiser (308). In some embodiments this occurs by the caller pressing a certain button on the key pad in order to request additional information about a product or service offered by the advertiser. As discussed in more detail below with respect to FIG. 4, additional affirmative actions are included in embodiments of the present invention as illustrated by step 312. In embodiments of the present invention, one or more affirmative actions are selected by a caller. In other embodiments, no affirmative actions are selected by the caller.

In step 316 the system tracks the affirmative action taken by the caller. In some embodiments this occurs by the database logging an entry which specifies the type of affirmative action and the date and time of its occurrence. Additionally, in step 320 the system tracks the time lapse to the end of the call. In some embodiments this occurs by the database logging an entry that specified the ending time of the call and associating that ending time with a first time associated with the start of the call. As illustrated by the dashed lines in FIG. 3, step 320 is an optional step that can be omitted. When step 320 is not performed, the system does not know the length of the call. In other embodiments this step is performed since advertisers may request a time log for billing or other purposes.

Figure 4:
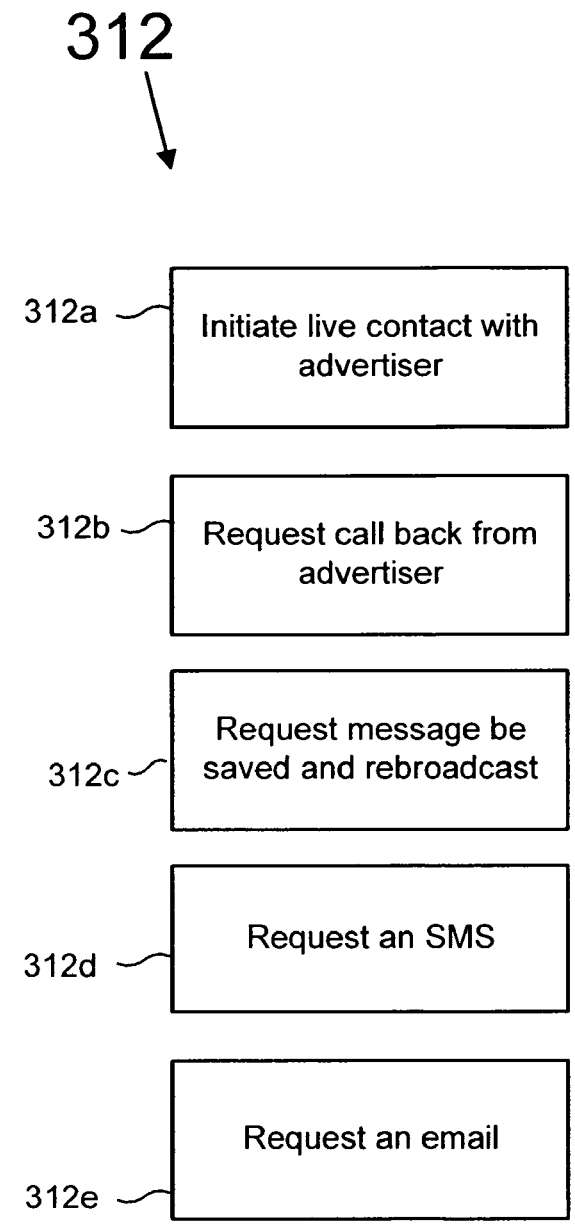
FIG. 4 is a simplified block diagram further illustrating options available to callers and a process for tracking selected options according to an embodiment of the present invention.

FIG. 4 is a simplified block diagram further illustrating options available to callers and a process for tracking selected options according to an embodiment of the present invention. Other embodiments provide for more affirmative actions (not illustrated) that a caller may select. For example, 312a provides a means for the caller to initiate live contact with the advertiser. As illustrated in Example 1, pressing the star button to hear more about the special offer is an affirmative action. In some embodiments, selecting an affirmative action is accomplished through pressing pound, star or some other button on the keypad. In other embodiments selecting an affirmative action is accomplished through speech recognition. In other embodiments, the caller leaves a voice mail for the sponsor if no live agent is available at the time of the affirmative action.

As an additional example, 312b illustrates the caller requesting a call back from the advertiser. In some embodiments this is accomplished through simply pressing a button on the keypad. The system already knows the caller's phone number and therefore no further action is required. In other embodiments, the caller specifies the desired call-back number. In some embodiments the call back is actually initiated by the system provider on behalf of or for the benefit of the advertiser. In other embodiments, the system provider simultaneously initiates a call to both the caller and the advertiser and then provides a bridging service to connect the two parties. One having ordinary skill in the art will appreciate that various other scenarios are within the scope of implementing the caller's request for a call back from the advertiser.

As yet another example, 312c illustrates the caller requesting that the recently delivered message be saved and re-transmitted at a later point in time. In some embodiments, the message is automatically transmitted when a call originates from the same ANI. In other embodiments, the message is stored in a personal voice mail box that the user accesses in the future when calling the service. A further example is the caller requesting that a message using the SMS protocol be sent (312d). In some embodiments, the message will contain the phone number information that was originally sought. In other embodiments the message will contain advertising content. An additional example is the caller requesting an email be sent (312e). In some embodiments, the email will contain the Phone Number information that was originally requested. In other embodiments the email will contain advertising content. As will be evident to one of skill in the art, additional affirmative actions are provided by embodiments of the present invention depending on the particular application.

It should be appreciated that the specific steps illustrated in FIG. 3 provide a particular method of providing directory assistance according to an embodiment of the present invention. Other sequences of steps may also be performed according to alternative embodiments. For example, alternative embodiments of the present invention may perform the steps outlined above in a different order. Moreover, the individual steps illustrated in FIG. 3 may include multiple sub-steps that may be performed in various sequences as appropriate to the individual step. For example, tracking the time lapse to the end of the call may require recording an initial start time, an ending time, and calculating the difference. Furthermore, additional steps may be added or removed depending on the particular applications. One of ordinary skill in the art would recognize many variations, modifications, and alternatives.

Marketers have long used gender segmentation as part of targeting strategies since some products are gender specific, appealing to women rather than men, or vice versa. Recent refinements in marketing methodologies also enable marketers of broadly used consumer goods to ascertain statistically significant variances in purchasing behavior as a function of gender. Consequently, by focusing advertising to the desired gender, advertisers can enhance efficiency in the deployment of advertising resources. Embodiments of the present invention include techniques for enabling marketers to increase such advertising efficacy on a real time basis in the context of the telephone as a marketing channel.

Figure 5:
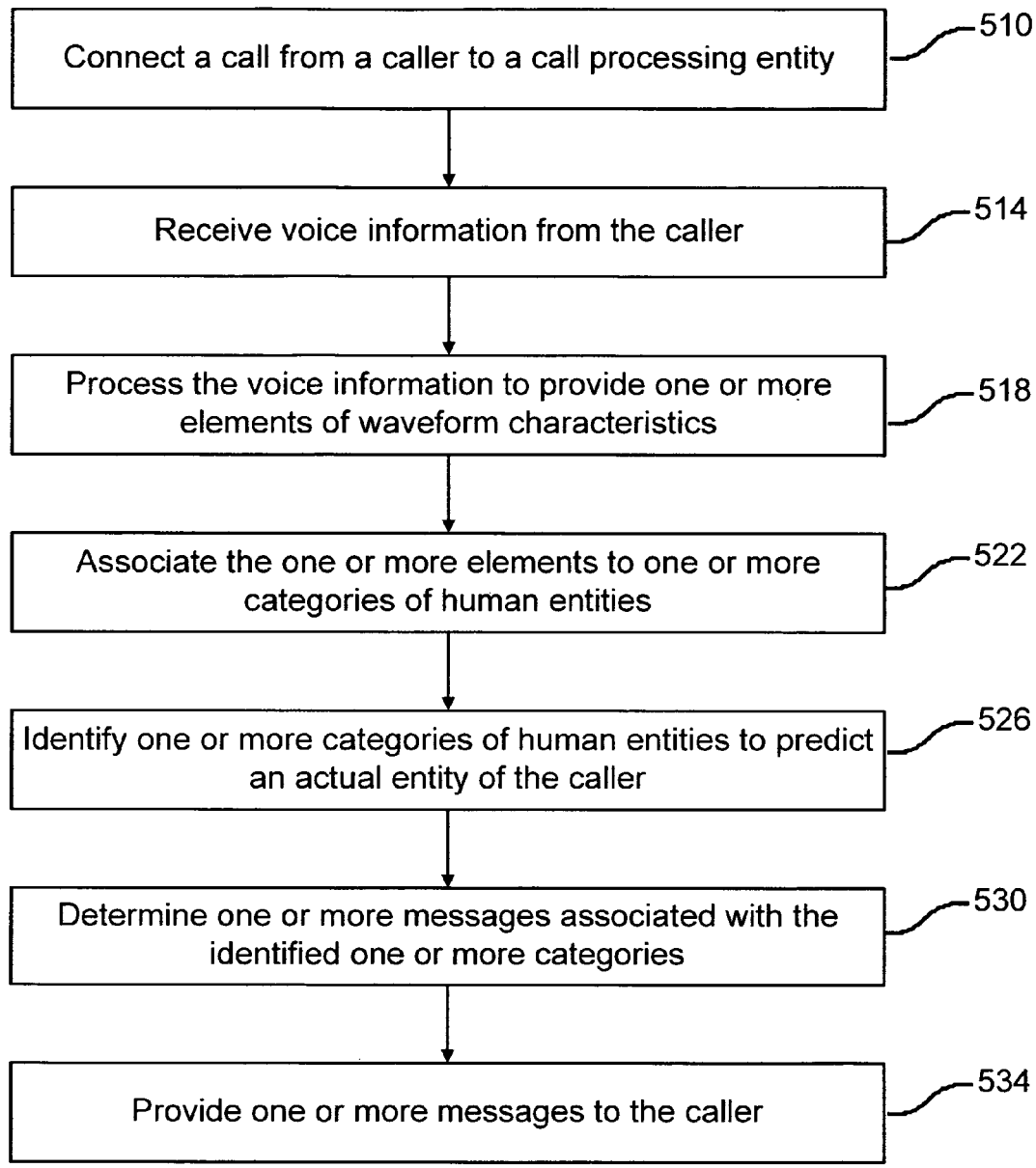
FIG. 5 is a simplified flow diagram illustrating a process for determining a message to transmit to an incoming caller in accordance with the caller's predicted gender according to an embodiment of the present invention.

FIG. 5 is a simplified flow diagram illustrating a process for determining a message to transmit to an incoming caller in accordance with the caller's predicted gender according to an embodiment of the present invention. In some directory assistance applications, advertisers are interested in communicating their messages to a particular gender, for example, a male or a female. Accordingly, embodiments of the present invention provide for automated determination of gender in operating a telephony system. In a particular embodiment, gender prediction algorithms are incorporated in conjunction with the selection criteria discussed above. Thus, utilizing the methods and apparatus provided by embodiments of the present invention, advertisers are able to target advertisements to particular genders in the context of a directory assistance call.

A call is connected from the caller to a call processing entity (510). In some embodiments, this occurs when a caller dials a toll-free number and that call is connected to the server or call center system. Voice information is received from the caller (514). In some embodiments, voice information is received when the caller states a city and state for which they are seeking directory assistance information. In other embodiments, the caller states the name of a business or residence for which phone number information is desired. In step 518, the voice information is processed to provide one or more elements of waveform characteristics. In some embodiments, the determining characteristic is the $F_o$ value, also known as the fundamental frequency or pitch. The fundamental frequency (pitch) is determined by the vocal tract length. In some embodiments, the vocal tract length is determined using linear predictive coding and the Cepstral coefficients. A person having ordinary skill in the art will appreciate that these methods are sufficiently robust and reliable to provide accurate waveform characteristics as utilized in gender prediction algorithms.

The one or more elements are associated to one or more categories of human entities, for example, male and females. In some embodiments, the system uses a chart including ranges of pitch and vocal tract length that correspond to observed gender characteristics. For example, male vocal patterns will tend to correspond to certain pitch and vocal tract lengths. Step 526 includes identifying one or more categories of human entities to predict an actual entity of the caller. In some embodiments, the system will predict that the caller is a female on the basis of the one or more elements of waveform characteristics that are associated with a female caller. In step 530, the system determines one or more messages associated with the identified one or more categories of human entity.

It should be appreciated that the specific steps illustrated in FIG. 5 provide a particular method of providing directory assistance according to an embodiment of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. For example, step 530 may involve multiple sub-steps to process sequential algorithms to determine the one or more messages. Furthermore, additional steps may be added or removed depending on the particular applications. One of ordinary skill in the art would recognize many variations, modifications, and alternatives.

FIG. 6 is a simplified database schema depicting gender selection criteria used in determining a message to transmit an incoming caller according to an embodiment of the present invention. In this database there are five rows (620, 624, 628, 632 and 636), each of which represents a record in the database. The database also contains four columns (604, 608, 612 and 616), each of which contains the label characterizing the type of data contained in the database. Thus, record 636 has an identifier (640), a message (644), a gender selection criteria (648) and a zip code (652). In alternative embodiments, additional elements are provided for the records depending on the particular applications. Generally, databases such as the one illustrated in FIG. 6 are generated based on advertiser preferences received by the operator of the directory assistance system.

Referring to FIG. 6, column 604 is the caller's phone number. In some embodiments, these phone numbers will be matched with identifiers in the system. As described above, these identifiers may themselves be phone numbers. The identifiers may have been provided ahead of time by advertisers. In other embodiments, these identifiers are accessed in real-time from the advertiser. In still other embodiments, these identifiers are provided either ahead of time or in real time by the system operator. In some embodiments, the identifiers are provided through another provider.

Column 608 illustrates the message associated with an incoming phone number. In some embodiments, these messages are ten second audio files conveying special offers or promotions from advertisers. Also, in some embodiments, the message is determined in real-time on the basis of all available information about the immediate caller, the call and the circumstances surrounding the call. In other embodiments, the message is determined off-line (e.g. ahead of time). Column 612 contains the gender selection criteria, which is male or female. In some embodiments, no gender selection criteria will be utilized because the advertiser is neutral with regards to gender. Column 616 contains the zip code, generally used for purposes of geographic targeting. In some embodiments, the zip code refers to the zip code of the calling party. In other embodiments, the zip code refers to the zip code of the party for whom the caller is seeking information. In still other embodiments, the zip code refers to the geographic location of the sponsor.

In some embodiments, there are multiple other selection criteria (not illustrated); for example, the system can take into account the caller's desired listing, time of day of call, geographic area, demographic characteristics, psychographic characteristics, caller's purchasing patterns or caller's history of system usage. In some cases the information that is compared to the selection criteria, for example, the time of day, will be known. In other cases, the information compared to the selection criteria will be inferred through the use of data compiled from information provided by consumers or businesses, or projected from such information. Information pertaining to the call (e.g., the incoming phone number) is matched to information in the database 600 or other databases.

Records 620 and 624 illustrate a situation where the same telephone number is targeted by two different messages. The difference between messages is attributable to the fact that one message is targeted to a male (record 620) and the other message is targeted to a female (record 624). Merely by way of example, an advertiser promoting a given product desires to advertise the product to the household with phone 650-723-2312. Based on market research, the advertiser has determined that different advertisements for the same product appeal to men and women with varying degrees of traction. For example, a home product marketed to a female caller is conveyed by a female voice in the advertisement, whereas the advertisement targeted to males is conveyed by a male voice. Alternatively, the content of the message could be tailored depending on the gender of the caller. Accordingly, the advertiser provides a message (15) targeted to males living in the residence as well as a different message (16) targeted to females living in the residence. Thus, in an embodiment of the present invention, if a call for directory assistance originates from this residence, gender prediction algorithms are utilized to predict the gender of the caller and provide advertising targeted to the gender of the caller. Utilizing embodiments of the present invention, advertisers are provided with methods and systems to provide appropriate advertisements not only to a particular telephone number, but preferably to individuals associated with the particular telephone number.

Referring again to FIG. 5, in some embodiments, step 530 occurs in real-time on the basis of all available information about the present caller, the call and the circumstances surrounding the call. In other embodiments, step 530 occurs off-line (e.g. ahead of time). After one or more messages are determined, the one or more messages are provided to the caller (534). In some embodiments, this is accomplished in aural fashion via the transmission of an audio message to the caller. In other embodiments, this is accomplished in a visual fashion through the transmission of text information to the caller via SMS, email or other such types of communication.

Currently, the data available to marketers contain a wide array of variables including name, address, landline phone number, income category, household composition, and various other demographics. However, this data generally does not contain wireless or mobile telephone numbers. We believe this is due, in part, to federal telemarketing laws prohibiting telemarketing to cellular telephone numbers. As a result, an ANI match on a call from a cellular user, in and of itself, is unlikely to yield the type of information that an ANI match on a residential number generally provides. This phenomenon poses a challenge for the ability of a free directory assistance service to provide appropriate advertising content of potential interest to callers when a significant percentage of directory assistance calls are placed from wireless telephones. Accordingly, embodiments of the present invention provide techniques and systems to address these challenges.

Figure 7:
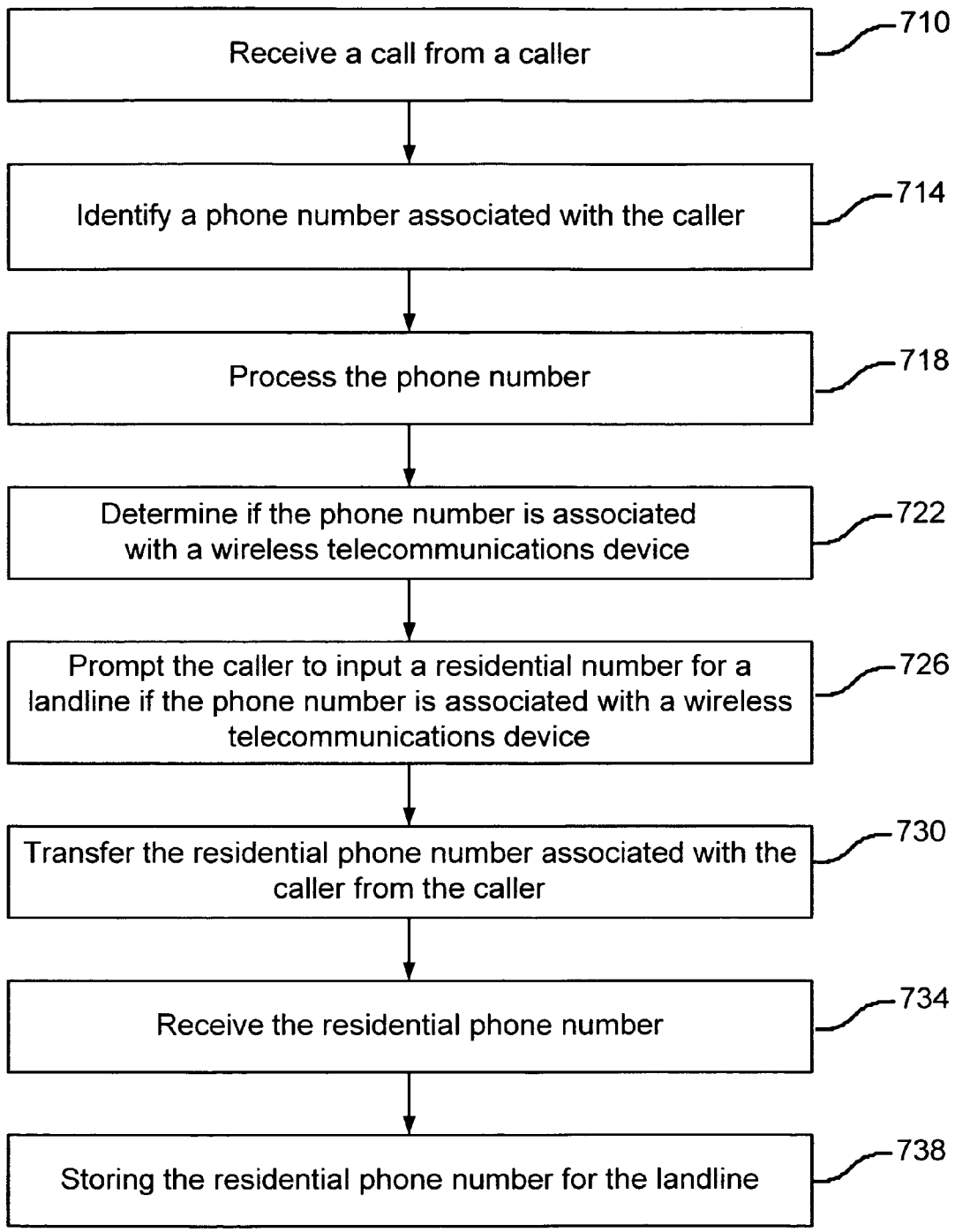
FIG. 7 is a simplified flow diagram illustrating a process for receiving a caller input relating a residential landline telephone number to a wireless telephone number according to an embodiment of the present invention.

FIG. 7 is a simplified flow diagram illustrating a process for receiving a caller input relating a residential landline telephone number to a wireless telephone number according to an embodiment of the present invention. Step 710 includes receiving a call from a caller. In some embodiments, the caller dials a toll-free number to access directory assistance services. In step 714 the phone number of the incoming caller is identified. In some embodiments, the number is identified using ANI technology. The phone number is then processed (718). In some embodiments this occurs through a process in which the server logs the phone number into a database for further computations or activities.

The system determines if the phone number is associated with a wireless or mobile telecommunications device, such as a cellular phone (722). In some embodiments, this determination occurs through a lookup to a database of carrier provided subscriber information. If the phone number of the user is associated with a mobile telecommunications device, the user is prompted to input a residential number associated with a landline (726). In some embodiments, the user is told to keystroke the number of his residential landline into the keypad of his cell phone. Accordingly, embodiments of the present invention provide for a linkage between a mobile telephone and a landline. Thus, for example, an association between multiple phone numbers would be generated for a person with both a landline home telephone and a mobile telephone In step 730 the residential phone number associated with that caller is transferred from the mobile telecommunications device to the system provider and in step 734 the system provider receives the residential phone number. In some embodiments step 734 is accomplished through the use of standard transmission protocols such as DTMF tones, in which the user's key stroking of the digits transmits a series of tones to the server that are then processed by the server and translated into one or more digits. In step 738, the residential phone number for landline is stored in a memory. In some embodiments, this is accomplished through storage in a database server, thereby establishing a relationship between the wireless telecommunications phone number and the residential landline phone number.

It should be appreciated that the specific steps illustrated in FIG. 7 provide a particular method of providing directory assistance according to an embodiment of the present invention. Other sequences of steps may also be performed according to alternative embodiments. For example, alternative embodiments of the present invention may perform the steps outlined above in a different order. Moreover, the individual steps illustrated in FIG. 7 may include multiple sub-steps that may be performed in various sequences as appropriate to the individual step. For example, step 726 may involve multiple sub-steps to prompt the caller for their residential telephone number and re-prompt an additional number of times as necessary. Furthermore, additional steps may be added or removed depending on the particular applications. One of ordinary skill in the art would recognize many variations, modifications, and alternatives.

Merely by way of example, possible user experiences are illustrated by the following three examples. These examples are not intended to limit the claims of the present invention, but merely to provide examples of the operation of a directory assistance system according to some embodiments of the present invention.

EXAMPLE 1

A caller dials a toll free number using their wireless telecommunication device. The caller is greeted with an automated voice prompt: "To continue using our free service, we do request our cellular users enter their home phone number just once every 12 months. This information is kept private. Please enter your ten digit home phone number followed by the pound key." This statement is followed by a pause, during which time the user preferably enters their home phone number. Generally, the caller keys in the residential phone number or speaks the residential phone number, which is detected by an automated process. The automated voice prompt continues, "If you do not have a home phone, press star now." The directory assistance call then proceeds using the sequence illustrated in previous examples, for instance, a prompt of: "What city and state please?"

Example 2

After initiating a call as illustrated in Example 1, a caller presses star and tells an Operator, "I don't have a landline at home. I only have a cellular phone." The Operator says, "Please accept our apologies for the inconvenience. The system will no longer ask you for your home phone number." Note that in one embodiment, the caller is offered an incentive to enter the residential telephone number when calling from a mobile telecommunications device, for example, a cellular phone.

FIG. 8 is a simplified database schema depicting the use of a wireless telephone number and a residential landline telephone number in determining a message to transmit an incoming caller according to an embodiment of the present invention. Column 804 includes the wireless phone number of the caller. Column 808 contains the residential phone number for the landline that has been associated with the caller's wireless telecommunications device. Column 812 contains messages that correspond to a particular residential phone number. In some embodiments, the message is determined in real-time on the basis of all available information about the present caller, the call and the circumstances surrounding the call. In other embodiments, the message is determined off-line (e.g. ahead of time). Column 816 contains an additional selection criterion of "Time of Day."

In some embodiments, there are multiple other selection criteria; for example, the system can take into account the caller's desired listing, geographic area, demographic characteristics, psychographic characteristics, caller's purchasing patterns or caller's history of system usage. In some cases the information, for example, the time of day, that is compared to the selection criteria will be known. In other cases, the information compared to the selection criteria will be inferred through the use of data compiled from information provided by consumers or businesses, or projected from such information, in which information pertaining to the call (e.g., the incoming phone number) is matched to information in the database 800 or other databases. In some embodiments, the wireless phone number is integrated into the database 200 illustrated in FIG. 2. As will be evident to one of skill in the art, once a wireless telephone number is associated with a landline phone, information associated with the landline phone can be used to provide more appropriate advertising to the wireless phone.

Records 820 and 824 illustrate a situation where the same residential landline number has two different cellular phones associated with the residential landline number. For example, a household with multiple mobile phones would provide this scenario. Records 832 and 836 illustrate a scenario where the same message is targeted to different residential landlines, which in turn are associated with different cellular numbers.

Figure 9:
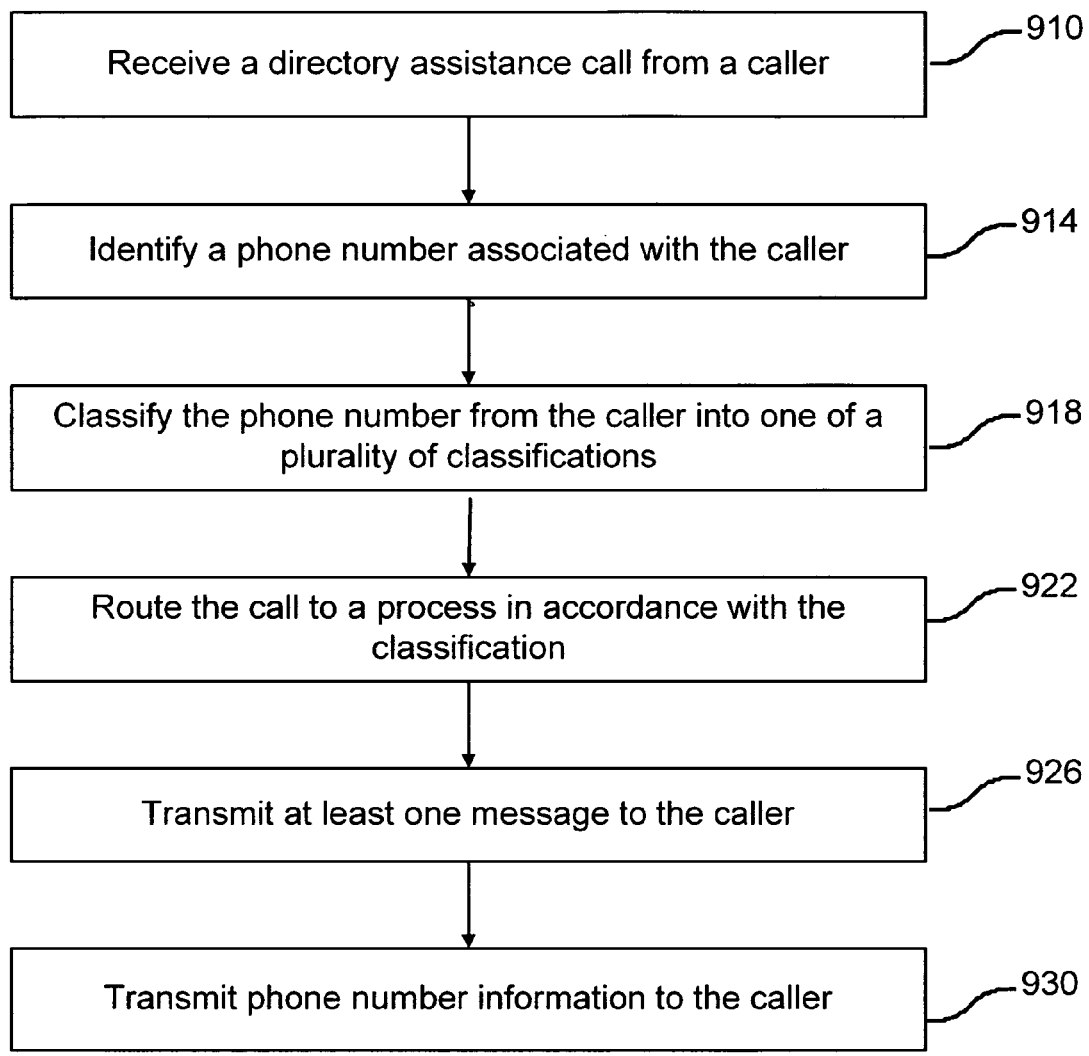
FIG. 9 is a simplified flow diagram illustrating a process for routing a directory assistance call in accordance with its value classification according to an embodiment of the present invention.

FIG. 9 is a simplified flow diagram illustrating a process for routing a directory assistance call in accordance with its value classification according to an embodiment of the present invention. Our research has shown that the directory assistance industry would benefit from call routing based on a value classification associated with a caller. For example, currently, lengthy hold times equally afflict the heaviest users of 411 as much as occasional users. Thus, during hours when call volume is heavy, all callers are subject to the same hold times without regard to their value as customers. Where directory assistance speech recognition systems and offshore call centers have been introduced, these systems and call centers have not employed call routing based on caller value.

Since all customers of any given carrier generally pay the same amount for any given type of directory assistance call, the carriers have not implemented a meaningful way of differentiating on the basis of caller value. Although it is likely that carriers could have developed alternative bases for caller value, including frequency of usage, the industry has failed to develop such bases. One possible explanation for this outcome is the fact that directory assistance has generally been a monopoly controlled offering in the United States for over four decades and thus there has historically been a reduced incentive to innovate in this area.

Embodiments of the present invention, which provide directory assistance information at a substantially free or reduced price, represent a fundamentally different business model. Technological innovations, including our findings that user value is attributable to user behavior, are incorporated in embodiments of the present invention. Accordingly, embodiments of the present invention utilize call value ranking to implement a variety of innovative call processing techniques.

As illustrated in FIG. 9, a directory assistance call is received from a caller (910). In some embodiments, the caller dials a toll-free number and the public telephone network routes this call to the server or call center of the system provider. The phone number from the caller is identified (914). In some embodiments, the number is identified using ANI technology as discussed above. The phone number from the caller is classified (918) into one of a plurality of classifications. As discussed in more detail in relation to FIG. 10 below, the framework in which the classification process is performed is related to identifiers, codes, and their associated values as stored in a database.

FIG. 10 is a simplified database schema depicting identifiers, codes and their associated values according to an embodiment of the present invention. Referring to FIG. 10, database column 1004 contains identifiers. In some embodiments, these identifiers are phone numbers. Database column 1008 contains value descriptors. In some embodiments, the descriptors are terms such as, "high", "medium", "low" or combinations thereof. Generally, these value descriptors are assigned to provide an indication of the value of a particular caller to a particular advertiser. Database column 1012 contains value codes. In some embodiments, these value codes are numbers within a given numerical range such as 1 to 100. In some embodiments, the value codes are assigned by the system operator. As illustrated by database elements 1032, 1036, and 1040, a particular embodiment of the present invention includes the classification of an incoming call from 650-812-3333 as a low value call with a value code of 17.

As described above, in some embodiments, the classification scheme is a numerical range. For example, a scale from 1 to 100 used in a specific embodiment. In this specific embodiment, a score of 1 corresponds to the lowest possible value and a score of 100 corresponds to the highest possible value. Furthermore, value codes are grouped into ranges in some embodiments of the present invention. Thus, a score between 1 and 25 inclusive is considered a low value; a score between 26 and 50 inclusive is considered low/medium value; a score between 51 and 75 inclusive is considered medium/high and a score between 76 and 100 inclusive is considered high value.

In embodiments using these numerical ranges, the phone number is initially classified on the basis of the previous history associated with the phone number. In some embodiments, this previous history includes the types of requests made by caller, the demographic characteristics associated with the caller, the previous affirmative actions undertaken by a caller, and the like. Merely by way of example, affirmative actions include requesting information from sponsors, requesting live connections to sponsors, and the like. Thus, in embodiments using these numerical ranges, the value classification is not static. Rather, the value classifications are updated as new information continues to be collected in relation to the phone number. As described in more detail below, each classification code is associated with a process for routing the call. As one of skill in the art will appreciate, this association can be performed in real-time or as an off-line operation.

In step 922, the call is routed to a process in accordance with the value classification. In order to provide additional details regarding step 922, the framework illustrated by FIG. 11 is provided. FIG. 11 is a simplified database schema depicting routing steps associated with one or more codes according to an embodiment of the present invention. The database illustrated in FIG. 11 contains four records (1120, 1124, 1128, and 1132). Database column 1104 contains value codes. In some embodiments, this code is a number within a determined numerical range. Database column 1108 contains the first step of a call routing process. In some embodiments, the step determines whether the call will be handled by a live operator or computer. For example, database record 1120 illustrates a situation where a human operator initially answers the call and therefore no further action is required in subsequent steps (see, for example 1152 and 1156). In some embodiments, the database illustrated in FIG. 11 is combined with the database illustrated in FIG. 10.

Database column 1112 contains the second step of the call routing process. In some embodiments, this step relates to the second iteration of dialogue between a caller and the computer. For example, the caller may state: "I want the listing of Domino's Pizza in Palo Alto." On the first iteration, the computer responds, "Did you say you want the listing of Domino's in Shallow Alto?" The caller says, "No, I said Palo Alto."During the second iteration of dialogue, the computer states: "Did you say Palo Alto?" In some situations, the second step by the computer would be bypassed (1160) and a human operator would engage the caller. In some embodiments, the bypassing of the computer in favor of a human operation is more likely to occur when the value code is of higher relative value. As an example, record 1132 illustrates a situation where the value code is classified at the lowest range of value. Therefore, this call is handled by a computer at every step, with no human intervention in subsequent steps (see, for example 1140, 1144, and 1148).

In some embodiments, the routing process described above will be associated with different types of call centers, namely high quality call centers or low quality call centers. To illustrate this distinction, higher value calls are routed to high quality call centers, whereas lower value calls are routed to the low quality call centers. In some embodiments, the process will be associated with a method of call processing involving a live operator, an automated computer process, or a blend of the two. Thus, in a particular embodiment, higher value calls are routed to live operators, medium value calls are routed to a blended process, and lower value calls are routed to a 100% automated process with no live operator fall back. As will be evident to one of skill in the art, the treatment of callers is a function of the predicted profitability of a particular caller in relation to their past system usage or the value of the caller established by the system operator.

In some embodiments higher value calls are initially handled by an automated computer during a first attempt at ascertaining the caller's request. Thereafter, if the computer is not able to ascertain the caller's request, the call is routed to a live operator for subsequent processing. In this manner, higher value callers do not experience multiple loops of interaction with the automated process. Lower value calls are passed to the automated computer for several attempts at ascertaining the caller's request before reverting to a live operator. Of course, calls valued at intermediate levels will experience fewer computerized interactions depending on the particular value of the call. One of ordinary skill in the art would recognize many variations, modifications, and alternatives.

Referring once again to FIG. 9, in step 926, at least one message is transmitted to the caller. In some embodiments, this message is a sponsored advertisement transmitted aurally. Depending on the embodiment, step 926 may be performed at a number of points during the call. In other embodiments, this message is a sponsored advertisement transmitted visually. The phone number information (i.e., the directory assistance listing requested in step 910) is transmitted to the caller (930).

It should be appreciated that the specific steps illustrated in FIG. 9 provide a particular method of providing directory assistance according to an embodiment of the present invention. Other sequences of steps may also be performed according to alternative embodiments. For example, alternative embodiments of the present invention may perform the steps outlined above in a different order. For example, the message could be transmitted after the phone number information is transmitted. Moreover, the individual steps illustrated in FIG. 9 may include multiple sub-steps that may be performed in various sequences as appropriate to the individual step. For example, step 922 may involve multiple sub-steps to route the call, which may be performed in various sequences within the scope of the present invention. Furthermore, additional steps may be added or removed depending on the particular applications. One of ordinary skill in the art would recognize many variations, modifications, and alternatives.

Figure 12:
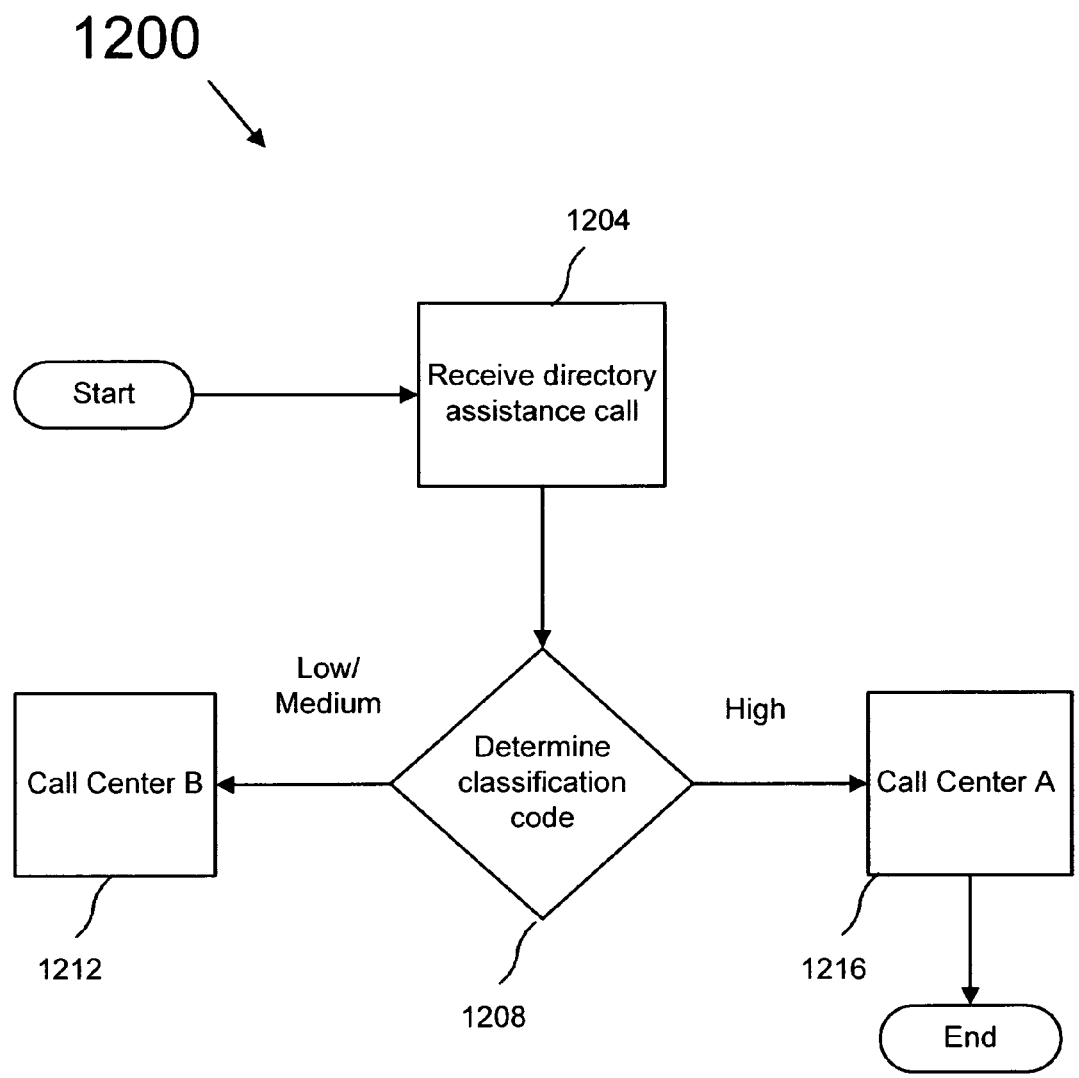
FIG. 12 is a simplified block diagram illustrating a process for routing a directory assistance call to a call center in accordance with its value classification according to an embodiment of the present invention.

FIG. 12 is a simplified block diagram illustrating a process for routing a directory assistance call to a call center in accordance with its value classification according to an embodiment of the present invention. A directory assistance call is received (1204). In some embodiments, the caller dials a toll-free number and the public telephone network routes this call to the server or call center of the system provider. At decision point 1208, a determination of the value classification occurs. In some embodiments, this determination yields a number with a predetermined numerical range. Generally, each number corresponds to a descriptor such as "low value", "low/medium value", "medium/high value", "high value," and the like. Calls with low/medium value are routed (1212) to an appropriate call center. In some embodiments, calls with low/medium value are routed to a lower quality call center. Calls with high value are routed (1216) to an appropriate call center. In some embodiments, calls with high value are routed to a higher quality call center. As will be evident to one of skill in the art, the determination of the descriptors and their association with the call routing protocol will depend on the particular applications.

Figure 13A:
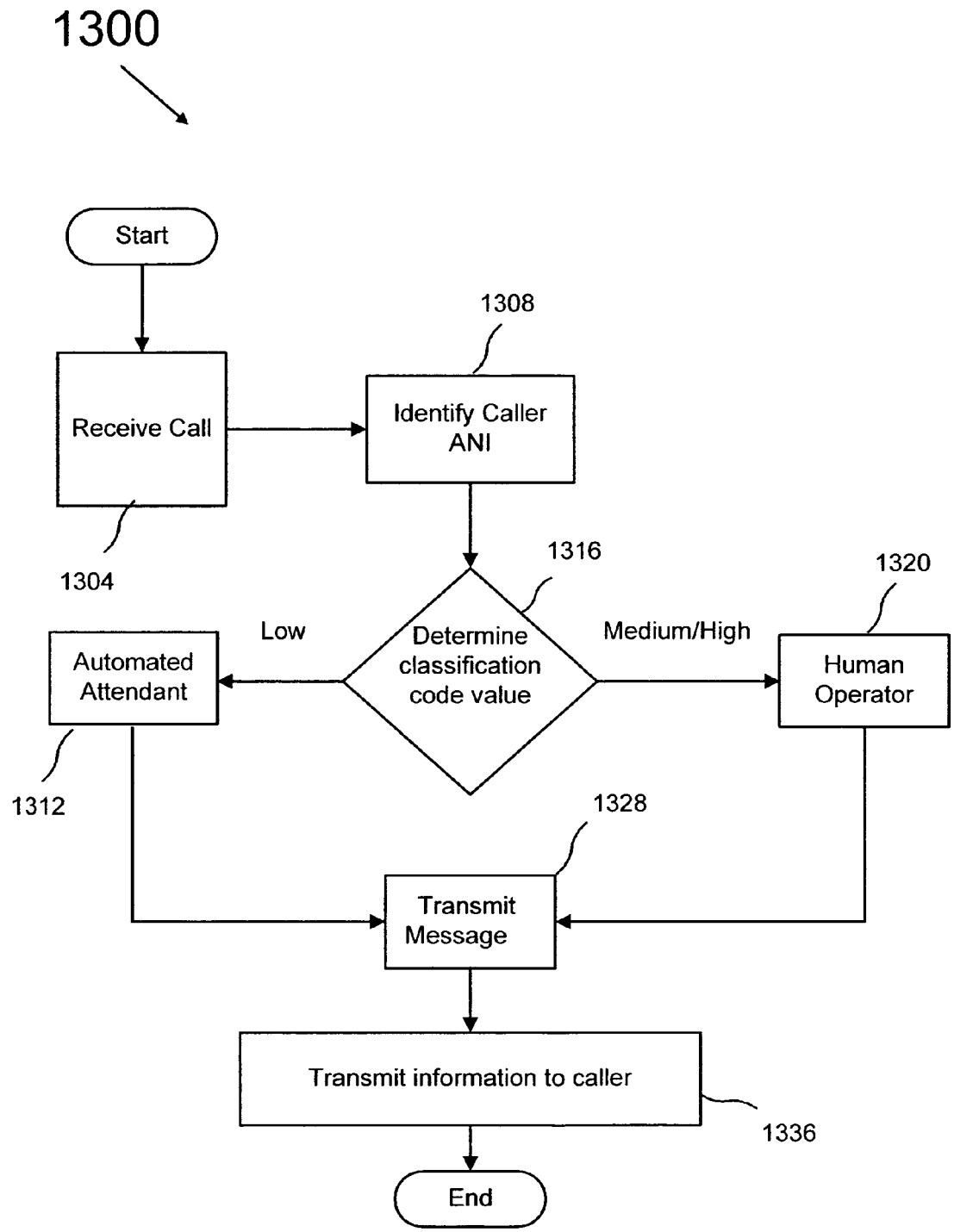
FIG. 13A is a simplified block diagram illustrating a process for routing a directory assistance call to an automated attendant or a human operator in accordance with the call's value classification according to an embodiment of the present invention.

FIG. 13A is a simplified block diagram illustrating a process 1300 for routing a directory assistance call to an automated attendant or a human operator in accordance with the call's value classification according to an embodiment of the present invention. A call is received (1304). The caller's phone number is identified (1308). In some embodiments, the number is identified using ANI information. At decision point 1316, the classification code value is determined. In some embodiments, this code value is a number within a predetermined numerical range. A low value call is handled by an automated attendant (1312). After the call is handled by an automated attendant, the caller hears a message (1328).

A high/medium value call is handled by a live operator (1320). After the call is handled by a live operator, the caller hears a message (1328). As illustrated in FIG. 13A, after receiving a message, either after interaction with the automated attendant or a live operator, the caller receives information originally requested (1336). In some embodiments, this information is traditional directory assistance information such as a phone number or the name of a business. In other embodiments, as discussed above, the directory assistance information includes stock quotes, weather information, restaurant reviews, combinations of these items, and/or the like.

Figure 13B:
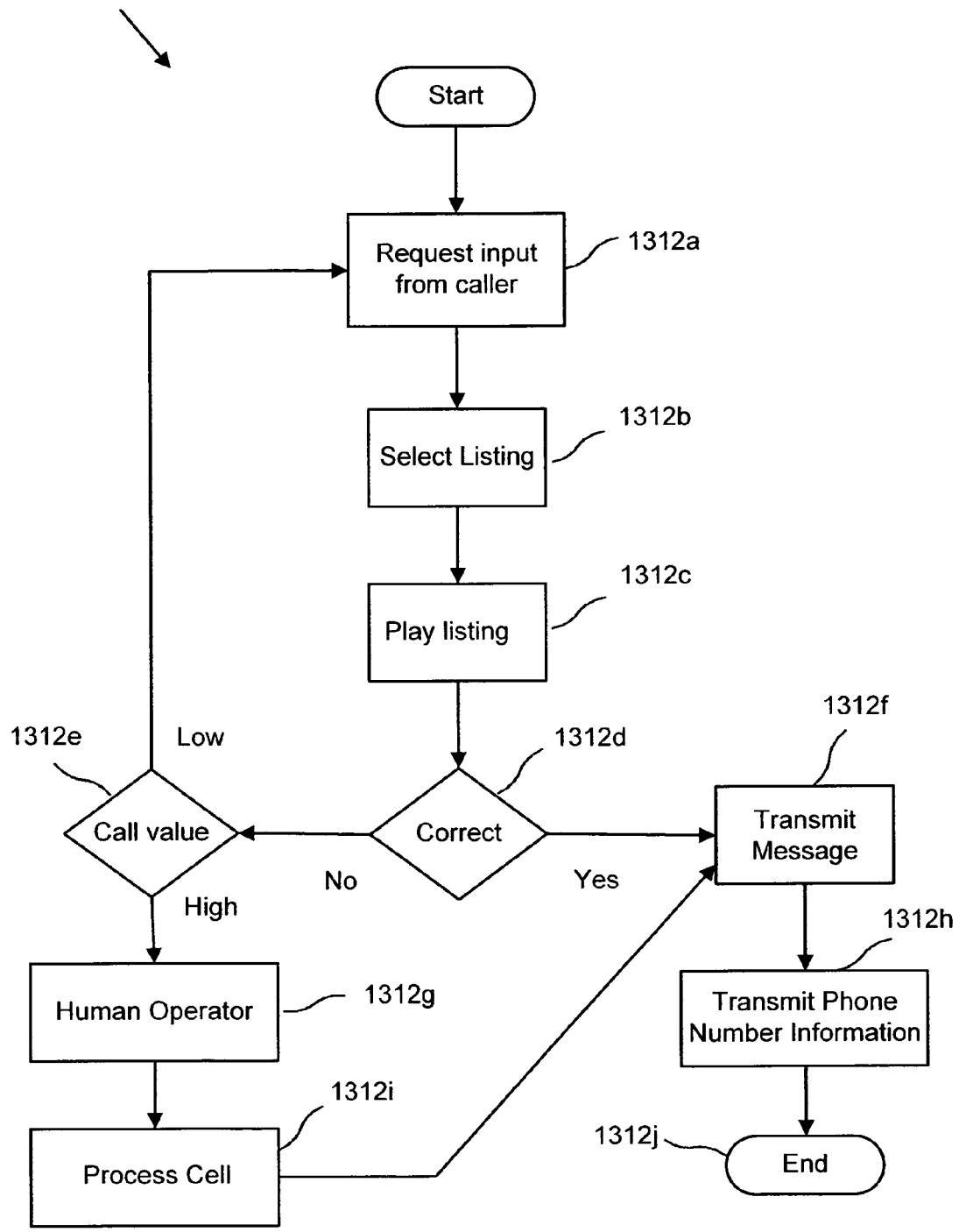
FIG. 13B is a simplified block diagram illustrating a process for extracting a directory assistance call from an automated attendant system in accordance with the call's value classification according to an embodiment of the present invention.

FIG. 13B is a simplified block diagram illustrating a process 1324 for extracting a directory assistance call from an automated attendant system in accordance with the call's value classification according to an embodiment of the present invention. In some embodiments, the process 1324 is utilized as part of step 1312 in FIG. 13A. In step 1312*a*, input from a caller is requested by an automated attendant. In Step 1312*b*, the system attempts to ascertain the appropriate listing and in the dialogue that ensues, the system plays that listing for the caller (1312*c*). In some embodiments, that exchange would occur in the following way: the caller states: "I want the phone number for the Domino's Pizza in Palo Alto." The computer ascertains that the caller has asked for Dormatto's Pizza in Palo Alto and states: "Did you want the number for Dormatto's Pizza in Palo Alto?"

At decision point 1312*e*, the caller offers a verdict on the accuracy of the computer's efforts. A verdict of "No" leads to decision point 1312*e* at which the system ascertains the call value. If the call has a low value, the caller is returned back to the automated attendant (1312*a*). If the call has a high value, the caller is transferred to a human operator (1312*g*), who processes the call to determine the correct listing (1312*i*), followed by transmission of a message (1312*f*). In some embodiments, this message is a sponsored advertisement. After transmission of the message, the phone number information determined in response to the request from the caller (e.g., the phone number of the Domino's Pizza in Palo Alto) is transmitted (1312*h*). In alternative embodiments, step 1312*h* occurs before transmission of the message. A verdict of "Yes" at decision point 1312*d* results in the transmission of the message (1312*f*) and the phone number information (1312*h*) to the caller. As will be evident to one of skill in the art, the definition of "low" and "high" value calls will depend on the particular application. Generally, as described above, the call value will be determined based on the caller identification information along with other demographic values and the like. Thus, these terms are merely representative of classification values and are not intended to limit the present invention.

In some embodiments, the step of determining the call value (1312*e*) includes an analysis of the number of times that a request has been input by the caller. In these embodiments, the number of times the caller has passed through the loop 1312*a*-1312*b*-1312*c*-1312*d*-1312*e* is monitored and recorded. As the number of loops increases, the threshold for passing the call to a human operator decreases. Thus, even for calls with a low value, several passes through the loop resulting in incorrect listings may result in passing of the call to a human operator.

Figure 14:
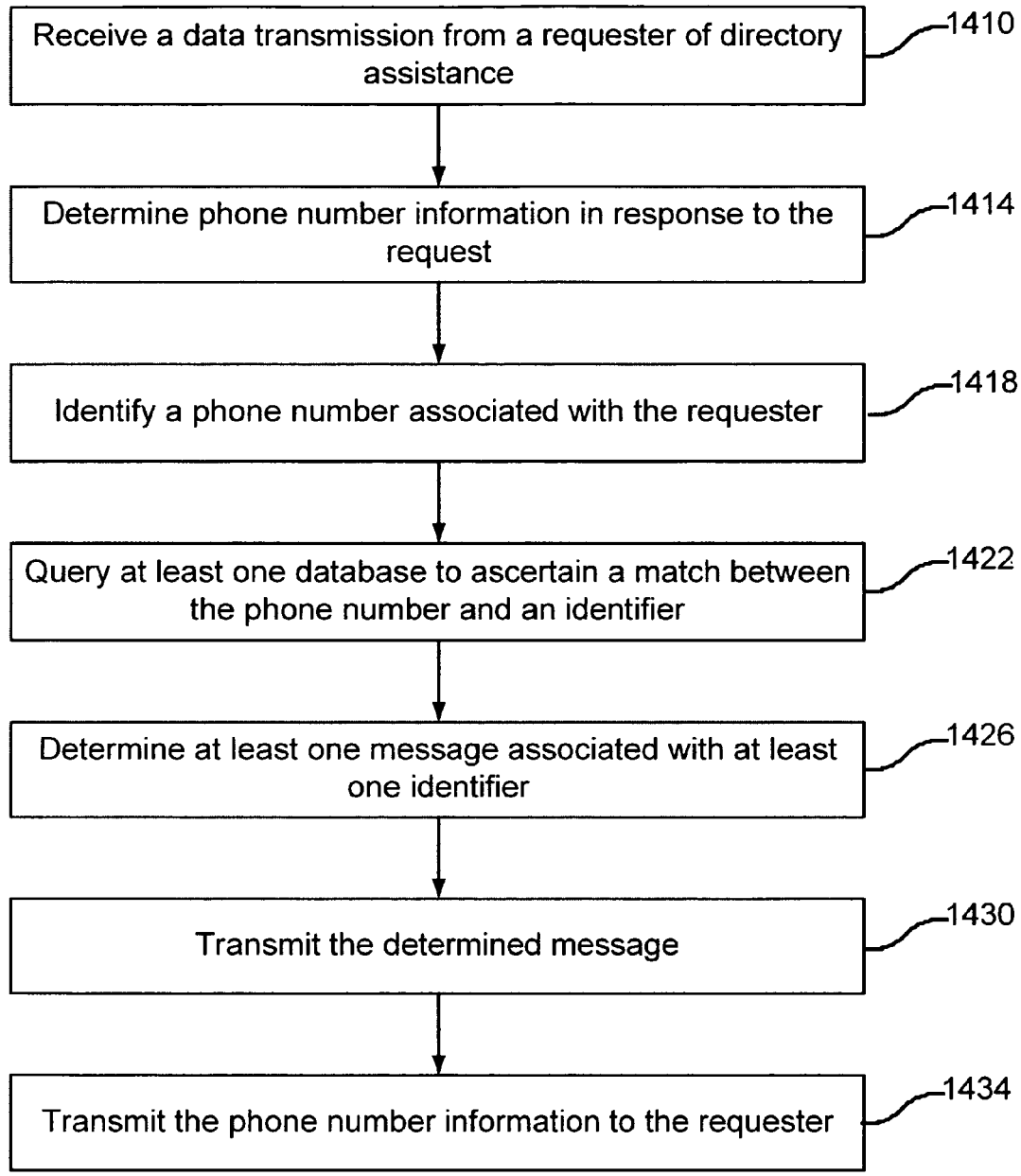
FIG. 14 is a simplified flow diagram illustrating a process for determining a message to transmit to a requester of directory assistance according to an embodiment of the present invention.

FIG. 14 is a simplified flow diagram illustrating a process for determining a message to transmit to a requester of directory assistance according to an embodiment of the present invention. In step 1410, a data transmission is received from the requester of directory assistance. In some embodiments, the transmission is provided through a wireless telecommunications data protocol. For example, in a specific embodiment, the protocol allows for the identification of the phone number associated with the device that has transmitted the wireless data request. Generally, the device will be a cellular telephone or a wireless personal digital assistant (PDA). In step 1414, phone number information is determined in response to the request. In some embodiments, the phone number information is a business phone number, a residential phone number, a business name and/or address, a residential name and/or address, weather information, a stock quote, product reviews, business reviews, news, combinations thereof, or the like.

In some embodiments, the method of determining the phone number information is handled by an automated process through a database system and automated query tools. In step 1418, a phone number associated with the requester is identified. For example, if the request for phone number information is delivered via an SMS message, the originating message number can be determined in a manner consistent with selecting the RP-Destination-Address parameter for reply. In some embodiments, this is accomplished using the TP-Originating-Address or TP-Reply-Path fields in the PDU. As will be evident to one of skill in the art, the selection of the originating address is not limited to SMS fields, but can be achieved using the appropriate originating address identification for any synchronous or asynchronous messaging protocol.

As the use of PDAs becomes more common, it is expected that an increasing number of consumers will no longer call live operators for directory assistance. Such consumers will likely prefer to submit their directory assistance request electronically. Thus, it is expected that operators of a free directory assistance service will face challenges. While it is less expensive to service such consumers when live operators do not have to receive voice based requests, substantial costs are still present with regard to expenses such as maintaining accurate directory assistance data. Moreover, the traditional ANI approach cannot be employed to identify a user who has submitted an electronic request using an electronic data transmission format. Accordingly, embodiments of the present invention provide techniques and systems for addressing these challenges.

At least one database is queried (1422) to ascertain a match between the phone number and an identifier. In some embodiments the identifier will itself be a phone number associated with a residential landline. In step 1426, the system determines at least one message associated with the at least one identifier. In some embodiments, the message is a textual advertisement. In other embodiments, the message is a audio or visual file. The determined message is transmitted (1430). For example, if the message recipient is using a device capable of receiving multimedia messages, such as MIME email, the message can be transmitted via email including visual and/or audio attachments. Alternatively, if the message recipient is using a device capable of receiving Multimedia Message Service (MMS) messages, the message can be transmitted via an MMS service provided by the device carrier, or via an MMS gateway. Further, if the device only accepts text messages, but allows those messages to include links to online information (e.g. web pages, WAP pages, and/or other net-accessible services), the message can be transmitted as a plain text message containing a link to a multi-media page on the network. As will be evident to one of skill in the art, the visual display is not limited to SMS or email as described above, but can be achieved with any asynchronous or real-time interactive visual communication system which provides for the presentation of audiovisual content.

In step 1434, the phone number information is transmitted to the requester. In some embodiments, this is accomplished through short message system (SMS). In other embodiments the phone number information is transmitted via email. Generally, transmission of the message is handled via the native transmission mechanism and protocol associated with the transmission medium. For example, in embodiments using SMS to transmit the phone number, the system will generate an SMS message with the phone number information and transmit it via an SMS gateway to the originating address. Alternatively, in some embodiments that use email, the system generates a brief email message with the relevant details. Such a scenario is contemplated in the SMS example described above, but may also include an acceptable email header block transmitted through the system's SMTP server for delivery to the recipient's mail server via the Internet (SMTP). As will be evident to one of skill in the art, the transmission of the phone number information is not limited to SMS or email, but can be achieved with any asynchronous or real-time interactive communication system which provides for the presentation of text or audiovisual content.

It should be appreciated that the specific steps illustrated in FIG. 14 provide a particular method of providing directory assistance according to an embodiment of the present invention. Other sequences of steps may also be performed according to alternative embodiments. For example, alternative embodiments of the present invention may perform the steps outlined above in a different order. For example, the determined message could be transmitted after the phone number information is transmitted. Moreover, the individual steps illustrated in FIG. 14 may include multiple sub-steps that may be performed in various sequences as appropriate to the individual step. For example, step 1426 generally includes a number of sub-steps, which may be performed in various sequences within the scope of the present invention. Furthermore, additional steps may be added or removed depending on the particular applications. One of ordinary skill in the art would recognize many variations, modifications, and alternatives.

In some situations or applications, the system can receive calls that are not associated with originating phone numbers. In this case the system diverts the call to an identification subroutine that preferably can uniquely identify the user before proceeding with the call. The identification subroutine typically asks the user to provide their home phone number, then adds this information to the session model. In some applications the subroutine may ask the user for other information (e.g. an account number, a pin code, or the like).

There are generally two cases in which a call can arrive without a phone number: The first case is when the call arrives from a medium that does not use phone numbers (e.g., a VoIP application that operates solely over the internet, a voice chat system in an instant message application, and the like). In embodiments of the present invention, these systems do provide other unique user identification information (e.g., the user name in an instant message application). According to an embodiment of the present invention, the system is aware that the delivery medium does not provide a phone number for any calls and automatically processes all calls from this medium appropriately. The system checks if the unique user identification provided by the medium is already associated with a known user with valid identifying information (e.g., a home phone number), and if so, adds the user's existing identifying information to the session model and continues the call as normal.

If the unique user identification provided by the medium is not associated with a known user with valid identifying information, then the system redirects the call to the identification subroutine, and associates the results of the subroutine with the medium-provided identifying information for future use. Merely by way of example, a VoIP caller's internet address would become associated with their home phone number. In the future, the user would not have to reenter their home phone number on future VoIP calls. The call flow then resumes as normal.

The second case is when the call arrives from a medium that uses phone numbers, but for some reason the phone number was not delivered, or when the call arrives from a medium that does not use phone numbers and does not provide any other unique user identification information. In embodiments of the present invention, the system notes the lack of any identity information, and redirects this specific call to the identification subroutine. Because the medium has not provided any unique identifying information which can be associated with the unique identifying information the user provides, calls from this device will continue to be redirected to the identification subroutine in the future. The call flow then resumes as normal.

While the examples illustrated herein do not represent calls associated with the traditional phone system, these transactions are referred to as a "call" for simplicity. As will be evident to one of skill in the art, embodiments of the present invention are not limited to voice applications and can be used with any other communication mechanism (e.g., SMS requests, email requests, any multimedia message system, and the like).

While the present invention has been described with respect to particular embodiments and specific examples thereof, it should be understood that other embodiments may fall within the spirit and scope of the invention. The scope of the invention should, therefore, be determined with reference to the appended claims along with their full scope of equivalents.

What is claimed is:

1. A system for facilitating communication, the system comprising:
    a memory; and
    a processor coupled to the memory and adapted to:
    receive a call from a caller, the call being provided through at least a telecommunication network,
    identify a phone number associated with the call, determine if the phone number is associated with a wireless telecommunications device, prompt the caller to input a residential phone number for a landline associated with the caller if the phone number is associated with the wireless telecommunications device, receive the residential phone number from the caller using a communications process, and
    store the residential phone number in association with the phone number into one or more memory locations of the memory.

2. A computer program product stored on a computer-readable storage medium for facilitating communications, the computer program product comprising:
    code for receiving a call from a caller, the call being provided through at least a telecommunication network;
    code for identifying a phone number associated with the call;
    code for determining if the phone number is associated with a wireless telecommunications device;
    code for prompting the caller to input a residential phone number for a landline associated with the caller if the phone number is associated with the wireless telecommunications device;
    code for transferring the residential phone number from the caller using a communications process;
    code for receiving the residential phone number; and
    code for storing the residential phone number in association with the phone number into one or more memory locations of one or more databases.

3. A system for operating a telephony system, the system comprising:
    one or more servers having an input handler, wherein the input handler is adapted to receive a call from a caller, the call being provided through at least a telecommunication network;
    a processor adapted to:
    receive a phone number associated with the call from the caller, wherein the phone number is identified using a caller identification process, and
    determine if the phone number is associated with a wireless telecommunications device;
    one or more servers having an output handler, wherein the output handler is adapted to prompt the caller to input a residential phone number for a landline associated with the caller if the phone number is associated with the wireless telecommunications device; and
    one or more databases coupled to the processor,
    wherein the input handler is further adapted to receive the residential phone number from the caller using a communications process, and
    wherein the processor is further adapted to store the residential phone number in association with the phone number into one or more memory locations of the one or more databases.

4. The system of claim 3 wherein:
    the processor is further adapted to associate the residential phone number to one or more messages provided in the one or more databases, the one or more databases comprising a plurality of stored phone numbers, each of the stored phone numbers having one or more messages, and
    the output handler is further adapted to transmit at least one of the one or more messages to the caller.

5. The system of claim 3 wherein the system provides for callers to receive one or more elements of information responsive to queries.

6. The system of claim 5 wherein the one or more elements of information are related to a directory assistance listing.

* * * * *